(12) United States Patent
Sugie et al.

(10) Patent No.: US 6,901,039 B1
(45) Date of Patent: May 31, 2005

(54) WRITABLE OPTICAL DRIVE WITH DYNAMICALLY VARIABLE LINEAR VELOCITY TO PREVENT BUFFER UNDER-RUN

(75) Inventors: Noboru Sugie, Chofu (JP); Akihiro Niimura, Sunnyvale, CA (US)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/959,001

(22) PCT Filed: Apr. 14, 2000

(86) PCT No.: PCT/US00/10033

§ 371 (c)(1),
(2), (4) Date: Apr. 2, 2002

(87) PCT Pub. No.: WO00/63897

PCT Pub. Date: Oct. 26, 2000

Related U.S. Application Data

(60) Provisional application No. 60/129,661, filed on Apr. 15, 1999.

(51) Int. Cl.$^7$ ................................................ G11B 7/00
(52) U.S. Cl. ........................ 369/47.28; 369/47.29; 369/47.3; 369/47.53; 369/53.1
(58) Field of Search ........................ 369/47.1, 47.11, 369/47.28, 47.29, 47.3, 47.31, 47.33, 47.46, 47.48, 47.5, 47.53, 53.1, 53.11, 59.1

(56) References Cited

U.S. PATENT DOCUMENTS

| | | | |
|---|---|---|---|
| 5,535,186 A | 7/1996 | Ishizawa | |
| 5,561,644 A | 10/1996 | Kondo | |
| 5,568,459 A | 10/1996 | Takamori et al. | |
| 6,317,809 B1 | * 11/2001 | Kulakowski et al. | ........ 711/112 |
| 6,418,099 B2 | * 7/2002 | Yamamoto | ............... 369/47.11 |

FOREIGN PATENT DOCUMENTS

| | | |
|---|---|---|
| JP | 10-293961 | 11/1998 |
| JP | 10-302387 | 11/1998 |

* cited by examiner

*Primary Examiner*—Muhammad Edun
(74) *Attorney, Agent, or Firm*—Knobbe Martens Olson & Bear LLP

(57) ABSTRACT

The present invention relates to methods and apparatus for dynamically varying a linear velocity of an optical drive during a write operation to an optical disc to reduce the likelihood of a buffer under-run event. By reducing a linear velocity and writing speed while the optical drive writes on the disc, an embodiment of the invention preserves the buffer and reduces a minimum data transfer rate required to sustain writing to the disc for a sustained period of time. The basic components of one embodiment of a CD-RW drive (100) in which the present invention may be implemented include a controller (110), a microcontroller (112), a non-volatile memory (114), which stores firmware (116) executed by the microcontroller (112), a buffer (118), a spindle motor (120) and an optical pick-up (122).

41 Claims, 15 Drawing Sheets

WRITABLE OPTICAL DRIVE WITH DYNAMICALLY VARIABLE LINEAR VELOCITY TO PREVENT BUFFER UNDER-RUN

RELATED APPLICATIONS

This application claims priority under 35 U.S.C. § 365(a) from International Application No. PCT/US00/10033, filed Apr. 14, 2000, and published under PCT Article 21(2) on Oct. 26, 2000 in English, which is hereby incorporated by reference.

This application also claims priority under 35 U.S.C. § 119(e) from U.S. Provisional Application No. 60/129,661, filed Apr. 15, 1999, which is hereby incorporated by reference.

BACKGROUND OF THE INVENTION

1. Field of the Invention

The present invention relates to optical disc recording devices such as CD-R, CD-RW, DVD-RAM, DVD-RW, and DVD+RW drives used with personal computers. More specifically, the invention relates to a method and apparatus for avoiding buffer under-run conditions during recording of an optical disc.

2. Description of the Related Art

A CD-RW (Compact Disc ReWriteable) drive is a type of peripheral storage device that is capable of recording and reading data to/from optical discs in a CD-R format and a CD-RW format. The CD-RW drive typically communicates with a host computer, such as a PC, over a peripheral device bus, such as a USB (Universal Serial Bus) or an ATAPI (AT Attachment Packet Interface). In current implementations, the CD-RW drive is capable of recording and reading at standard CLV (constant linear velocity) rotational speeds, designated as 1×, 2×, 4× and 8× (and also referred to as single speed, double speed, quad speed, etc.). The linear velocity of the disc varies with the rotational velocity of the disc and the radius from the center of the disc at which an optical pick-up is accessing the disc.

During the recording process, the host computer sends a stream of data across the peripheral device bus to the CD-RW drive. The CD-RW drive temporarily stores the data in a FIFO (first-in-first-out) buffer, and then writes the data to a continuous spiral track of the disc. The rate at which the data is read from the buffer and written to the disc is proportional to the linear velocity of the optical disc.

In current implementations, once selected, the linear velocity of the optical disc cannot be changed during the write process. Higher linear velocities are preferred because the time it takes for a CD-RW drive to write to an optical disc is inversely proportional to the linear velocity of the optical disc.

However, the rate at which data is transferred from the host to the CD-RW drive can fluctuate during the recording process. Such fluctuations can occur, for example, when other peripheral devices such as printers occupy bandwidth on the peripheral device bus. As the result of these fluctuations, it is possible for the drive's buffer to become empty (referred to as a "buffer under-run" condition), resulting in an interruption to the data stream provided to the optical disc.

The result of an interruption to the data stream of the optical disc is an unrecoverable error. Where the optical disc is a CD-R disc, the disc becomes permanently unusable, wasting both time and the disc. Where the optical disc is a CD-RW disc, the disc can be re-written from scratch, but at the cost of frustration and additional time. Re-writing a CD-RW disc is particularly inconvenient when the CD-RW contained data from prior writes.

Table 1, below, provides a summary of selected speeds of an optical drive writing to a CD-R or CD-RW.

TABLE 1

| Speed | Data Transfer Rate | Time to Write 650 MB |
| --- | --- | --- |
| 1X (single speed) | 150 kB/sec | 72 minutes |
| 2X | 300 kB/sec | 36 minutes |
| 4X | 600 kB/sec | 18 minutes |
| 8X | 1.2 MB/sec | 9 minutes |

To avoid a "buffer under-run" condition, a partial solution is to dramatically increase the size of the buffer. A typical buffer is about 2 to 4 MB in size. The practical considerations of size and cost make it difficult for a buffer to approach the size of the capacity of a full 650-MB Compact Disc. Therefore, a large buffer generally offers protection only against a short-term fluctuation in the data rate. Should the peripheral device bus speed fall below the data rate required by the selected linear velocity for a sustained period of time, the large buffer would eventually under-run, resulting in the unrecoverable error.

Another partial solution has been to allow selection of a slower linear velocity than the maximum permissible by the drive. Although selecting a slow write speed allows the drive to record on a CD-R or CD-RW at a lower data transfer rate, once selected, the drive write to the entire disc at the slow speed. Writing to a CD-R or CD-RW at a speed slower than the system allows is disadvantageous because the slow speed wastes time. As indicated by Table 1, writing to an entire CD-R or CD-RW at single speed (1×) can take longer than one hour.

The dramatically increased data storage capability of more recent optical discs, such as DVD-RAM, DVD-RW, and DVD+RW, further exacerbates the dilemma of choosing between a slow write speed for reliability versus a fast write speed for speed. For a given peripheral device bus speed, the increased data storage capability of DVD increases the duration of time it takes to record a full DVD. The increased duration of time results in greater exposure to potential fluctuations in the data rate of the peripheral device bus. However, the greater storage capacity also encourages the use of higher bandwidth data rates to reduce the writing time, thereby increasing the susceptibility to fluctuations in the peripheral device bus.

SUMMARY OF THE INVENTION

The present invention relates to methods and apparatus for dynamically varying a linear velocity of an optical drive during a write operation to a disc to reduce the likelihood of buffer under-run events. An embodiment of the present invention detects a condition likely to lead to a buffer under-run event and takes a proactive step to possibly prevent the buffer under-run event and in the least, prolong a duration until the buffer under-run event occurs. The proactive step comprises a reduction in a linear velocity and writing speed while writing to the disc, thereby reducing the rate by which the drive consumes data from the buffer and reducing a minimum data transfer rate required for sustained writing to the disc.

Embodiments of the present invention advantageously combine, in a single recording session, the fast write time of high linear velocity (such as 8×) with the low data transfer rate requirements of low linear velocity (such as 1×). Embodiments of the present invention enable a user to select a fast writing speed without having to worry about the system sustaining a data transfer rate required by the fast writing speed. Embodiments of the present invention uniquely feature reliable writing at the maximum attainable speed permitted by the system.

By automatically adjusting a linear velocity and writing speed on the fly, an embodiment of the present invention further relieves a user of the burden of anticipating future bus conditions and attempting to manually select an optimal writing speed.

One embodiment functions inside an optical drive adapted to record data on an optical disc. The drive can vary a write speed to the disc while writing to the disc. By reducing the write speed, the drive can decrease the minimum data transfer rate required by the drive to sustain writing. The drive includes a spindle to rotate the disc, an optical pick-up to write data to and read data from the disc, and a controller adapted to control and vary a linear velocity while writing to the disc. Preferably, the drive includes a memory buffer, which temporarily stores data to be written to the disc.

The drive preferably detects when to slow down or speed up by monitoring a level of the memory buffer. The drive slows down the linear velocity and the write speed in response to a low buffer level. The drive speeds up in response to a high buffer level.

One embodiment determines the write speed by monitoring the rate of data transfer between the host and the drive. The drive slows down in response to a low data transfer rate. The drive speeds up in response to a high data transfer rate.

In a Compact Disc environment, such as CD-R and CD-RW, one embodiment preferably limits a rate of change of linear velocity to one EFM frame per subcode frame. Another embodiment limits a rate of change of linear velocity to one EFM frame per two subcode frames. Preferably, an embodiment maintains a rate of change within the torque limitations of the spindle.

One embodiment synchronizes the writing speed and the linear velocity of the disc to a variable frequency clock. By changing a frequency of the variable frequency clock, both the linear velocity and the writing speed change.

In a Compact Disc environment, an embodiment preferably maintains the linear velocity above 1×. Another embodiment preferably maintains the linear velocity above 0.5×. Yet another embodiment maintains a linear velocity above 0.5× when writing to a portion of the disc close to the center, and maintains a linear velocity above 1× when writing to a portion of the disc close to an outer edge of the disc. Yet another embodiment maintains a minimum angular velocity for the spindle. Preferably, an embodiment is configurable to allow the host to set a minimum linear velocity or writing speed.

Preferably, an embodiment of the invention is further adapted to vary the writing power of the laser dynamically. As the embodiment writes to the disc, the embodiment monitors and maintains the writing power to the disc to maintain a substantially optimal writing power under conditions including a change in the linear velocity.

An embodiment of the present invention includes a method of writing to an optical disc with an optical drive wherein the linear velocity of the disc changes while the writing is taking place. An embodiment performing the method receives streams of data from a host, moves data from the stream of data in a buffer, writes data from the buffer to the disc in a substantially constant linear density, and changes a linear velocity of the disc while writing to the disc in response to detecting a condition which could otherwise lead to a buffer under-run. An embodiment performing the method preferably detects the condition and changes the linear velocity in response to the condition by monitoring a level of data in the buffer. According to a preferred method, an embodiment decreases the linear velocity of the disc when the condition indicates that the level of data in the buffer has decreased. Likewise, an embodiment may increase the linear velocity of the disc when the level of data in the buffer has increased. Preferably, an embodiment restores a previously set linear velocity when the communication link restores the level of the buffer beyond a preset threshold. According to another preferred method, an embodiment decreases the linear velocity in response to a slow data transfer rate. According to still another preferred method, an embodiment increases the linear velocity in response to a high data transfer rate.

The method may direct a change in the writing speed by changing a frequency of a clock. The writing to the disc and the linear velocity of the disc are preferably synchronized to a clock whose frequency varies in a controlled manner. By varying the frequency of the clock, the writing speed and the linear velocity change. Preferably, the method includes monitoring a characteristic of reflected light from the disc while writing and maintaining a writing power to the disc such that the drive makes substantially optimally sized marks on the disc.

An embodiment of the invention includes a write power control circuit adapted to maintain a substantially optimal laser power while changing a writing speed and linear velocity of an optical disc. The circuit includes an amplifier, a sampling circuit, and a feedback circuit. The amplifier controls the write power of the laser. The sampling circuit detects a characteristic of marks made by the laser. The feedback circuit adjusts the output of the amplifier to maintain the write power of the laser, enabling the laser to make substantially optimal marks. Preferably, the amplifier includes a digital to analog converter, which controls the output of the amplifier. In one embodiment, the sampler detects a size of a mark, as the mark is made by the laser, as the characteristic. The feedback circuit includes a substantial range of adjustment to compensate for a change in write power due to a change in linear velocity. Preferably, the write power control circuit further includes a speed detecting circuit for measuring the linear velocity of the disc.

An embodiment of the invention includes a method of controlling a write power of a laser while the laser is writing to an optical disc. The write power, which makes substantially optimal marks, can vary with the linear velocity such that a substantially optimal write power at a low linear velocity may be lower than a substantially optimal write power at a high linear velocity. The method operates by changing a linear velocity of the disc while writing to the disc, detecting a characteristic of a mark made by the laser, comparing the detected characteristic to a target characteristic, and adjusting the write power of the laser substantially optimize the characteristic of the marks made by the laser.

An embodiment of the invention includes a controller circuit adapted to control a linear velocity such that the linear velocity may be changed while a drive is writing to an optical disc. The controller circuit includes a circuit that detects a signal indicating when data is being written to the disc, a circuit that detects a signal indicating a position of the disc, and a clock circuit that generates a third signal. The third signal, or a derivative of the third signal, controls the linear velocity and the write speed. The controller circuit maintains a timing of the third signal such that the signal indicating when the data is being written to the disc and the signal indicating the position of the disc maintain a phase relationship and a frequency relationship. Preferably, the phase relationship maintained corresponds to ±1 EFM frame per subcode frame.

An embodiment of the invention includes a system comprising a control circuit, buffer, writing circuit, detection sensor, and writing circuit. The control circuit receives data from the host computer. The buffer stores the data received by the control circuit until the data has been written to an optical disc. The writing circuit receives data from the buffer and converts the data into a series of marks written by a laser on the disc. The detection sensor monitors a condition that could lead to a buffer under-run. For example, the detection sensor can monitor a buffer level or a data transfer rate, and indicate when a buffer under-run may occur. The detection sensor can be a firmware routine that tracks the flow of data in and out of the buffer. In another embodiment, the detection sensor is a circuit which, for example, counts up when blocks of data flow into the buffer and counts down when blocks of data flow out of the buffer. When the detection sensor indicates that a buffer under-run may occur, the writing circuit decreases the rate at which the optical drive writes to the disc by decreasing a linear velocity of the disc.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

DETAILED DESCRIPTION OF THE PREFERRED EMBODIMENTS

Although this invention will be described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

The present invention addresses the above problem by providing a recordable optical drive, such as a CD-RW drive, that automatically adjusts the disc rotation speed, and thus the write speed, in response to fluctuations in the transfer rate over the peripheral device bus. The adjustments to the rotation speed are preferably made based on (a) the quantity of data in the buffer (referred to as the "buffer level"), (b) the transfer rate at which data is being written to the buffer, or (c) both. In one embodiment, referred to as the "step method," the rotation speed can be set only to the drive's standard speeds, such as 1×, 2× and 4× speed. In another embodiment, referred to as the "continuous method," the rotation speed can be adjusted over a continuous range.

Figure 1:
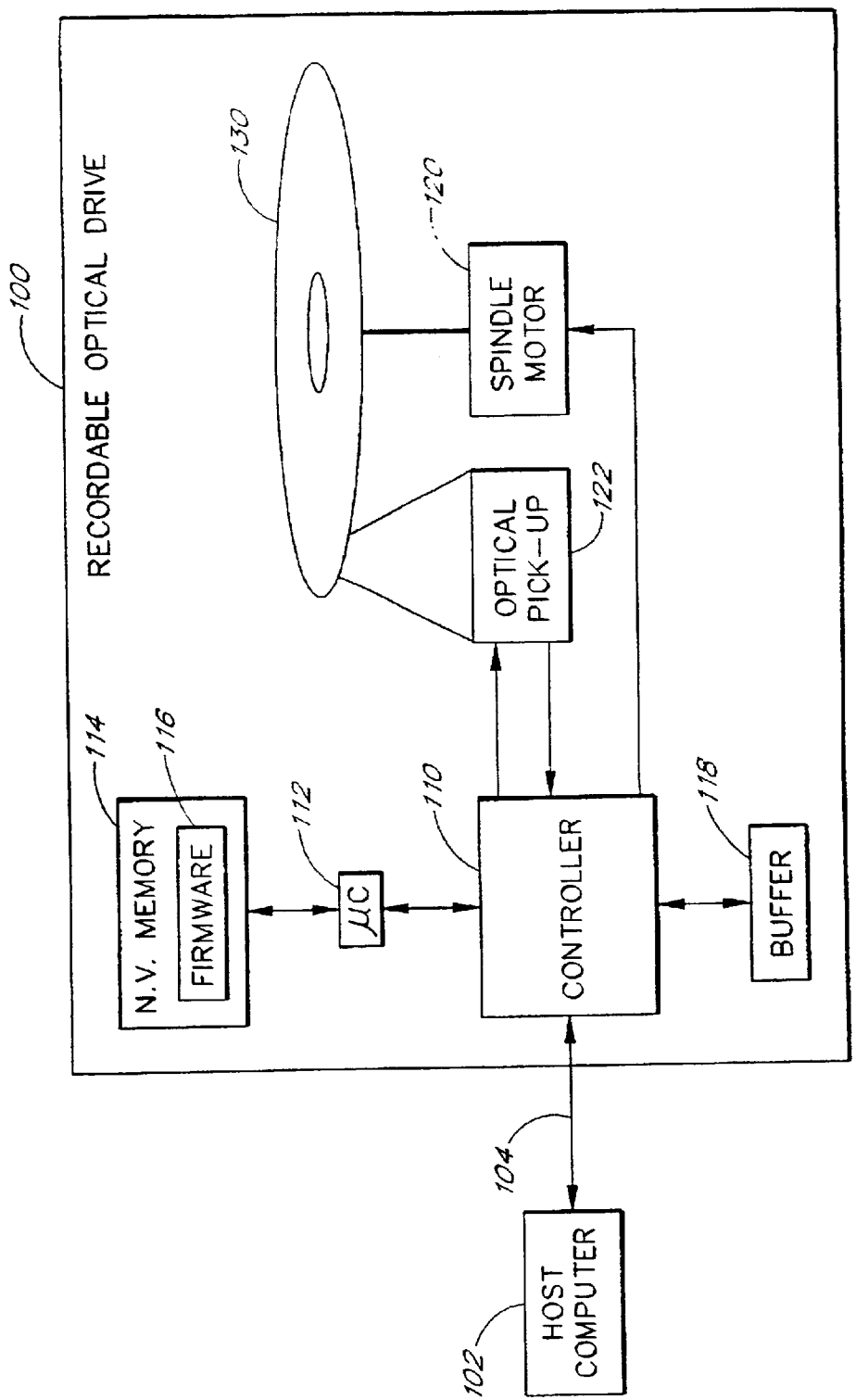
FIG. 1 illustrates a top-level of an optical drive system connected to a host computer.

FIG. 1 illustrates the basic components of a CD-RW drive 100 in which the present invention may be implemented. The drive 100 is shown together with a host computer 102 from the environment. The host computer 102 includes devices such as a host PC, a Personal Digital Assistant (PDA), and digital cameras and camcorders. The drive 100 is shown connected to the host computer 102 through a communication link 104. In one embodiment, the communication link 104 is a USB cable. In another embodiment, the communication link 104 is a wireless infrared connection. In other embodiments, the communication link 104 comprises other types of cables and interfaces including ATAPI, SCSI, and a parallel port.

The drive 100 includes a controller 110 (typically implemented using one or more ASICs or PLAs), a microcontroller 112, a nonvolatile memory 114 which stores firmware 116 executed by the microcontroller 112, and a buffer 118 (typically 2 to 4 megabytes). In addition, the drive 100 includes a spindle motor 120 and an optical pick-up 122. The spindle motor 120 controls the rotation speed of an optical disc 130. As the drive 100 rotates the disc 130, the optical pick-up 122 of the drive 100 reads and writes data to/from the disc 130.

During a disc recording session, the host computer 102 sends packets of data over the communication link 104 to the drive 100, and the controller 110 temporarily stores these packets in the buffer 118. During this process, the controller 110 continuously reads the packet data from the buffer 118 on a first-in-first-out basis and provides such data to the optical pick-up 122 for writing to the disc 130. The rate at which data is read from the buffer 118 and written to the disc 130 is directly proportional to the linear velocity of the rotating optical disc. A typical linear velocity is 4× during normal operation. At the constant linear velocity of 4×, the recording process typically takes about 18 minutes for a full 650 MB recordable Compact Disc. At a constant linear velocity of 4×, the rate at which data is written to the disc 130 is 600 kB per second. At 4×, data transfer rates over the communication link 104 slower than 600 kB per second result in a depletion of the buffer.

If, during the recording process, the host computer 102 allows the buffer to become empty, an interruption will occur in the data stream provided to the optical pick-up 122, and the disc 130 could become unusable. To reduce the likelihood of such a buffer under-run condition according to the invention, the firmware 116 is provided with one or more routines for dynamically adjusting the rotation speed of the disc 130. In addition, the controller 110 is provided with special circuitry (see FIG. 2) for (a) adjusting the write power used by a laser in the optical pick-up 122 to write data to the disc 130, and (b) synchronizing the operation of the controller with the current rotation speed of the disc 130.

Figure 2:
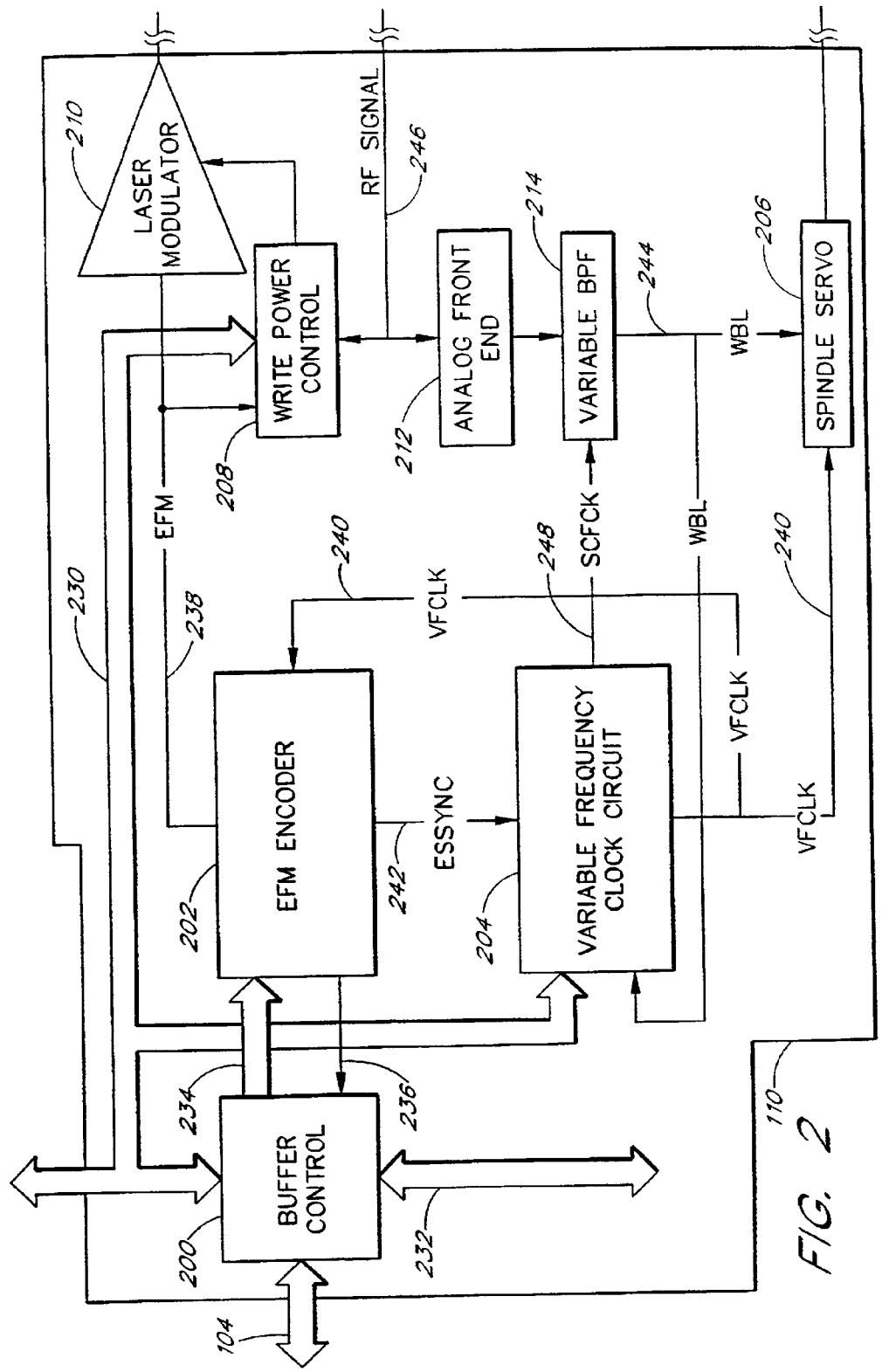
FIG. 2 illustrates a top-level view of an embodiment of a controller for an optical drive system according to the invention.

FIG. 2 illustrates further details of one embodiment of the controller 110. The controller 110 may be used to dynamically vary the write speed and the linear velocity of the disc 130. The controller 110 shown in FIG. 2 includes a buffer control 200, an EFM encoder 202, a variable frequency clock circuit 204, a spindle servo 206, a write power control 208, a laser modulator 210, an analog front end 212, and a variable BPF 214. As will be explained in greater detail later, one embodiment varies the write speed and the linear velocity of the disc 130 by varying an output frequency of the variable frequency clock circuit 204.

The buffer control 200 communicates with the microcontroller 112 through a microcontroller bus 230, the host computer 102 through the communication link 104, the buffer 118 through the buffer bus 232, and the EFM encoder 202 through both the EFM bus 234 and an EFM handshake signal 236. The microcontroller 112 controls the overall writing process and may request status from the buffer control 200. For example, the buffer control 200 may place data on the microcontroller bus 230 indicating a condition of a fullness of the buffer 118, a speed of the communication link 104, etc. A more detailed description of information flowing on the microcontroller bus will be discussed in the description of the firmware 116. The buffer control 200 communicates with the buffer 118 through the buffer bus 232 to place data on the buffer 118 and retrieve data from the buffer 118. The buffer control 200 communicates with the EFM encoder 202 through the EFM bus 234 to transmit data which will be stored in the disc 130. The EFM handshake signal 236 enables the EFM encoder 202 to control a rate by which the buffer control 200 transmits the data to the EFM encoder 202.

The EFM encoder 202 encodes the data from the buffer control 200 into a standard eight to fourteen modulation format, and transmits the EFM 238 to the laser modulator 214 with a precise timing synchronized to the linear velocity of the disc 130. In one embodiment, the EFM encoder 202 synchronizes the EFM 238 to the disc 130 by transmitting the EFM at a bit rate equal to and synchronized to a VFCLK signal 240. The EFM encoder 202 may further include an ESSYNC signal 242, which may be used by the variable frequency clock circuit 204 to monitor the synchronization between the EFM and the disc 130.

The variable frequency clock circuit 204 controls the writing speed and the linear velocity of the disc 130. One embodiment supports a selectable mode in which the linear velocity stays constant by fixing the output frequencies of the variable frequency clock circuit 204. The linear velocity of the disc 130 and the writing speed to the disc 130 are both controlled by the frequency of the VFCLK signal 240. In one embodiment, the microcontroller 112 selects the frequency for the VFCLK signal 240. In another embodiment, the buffer control 200 selects the frequency for the VFCLK signal 240. The variable frequency clock circuit 204 will be explained in greater detail in the description for FIG. 3.

The spindle servo 206 controls the linear velocity of the disc 130 by controlling the rotational speed of the spindle motor 120. The spindle servo 206 receives the VFCLK signal 240. The VFCLK signal 240 establishes the desired linear velocity for the disc 130. A WBL signal 244 indicates the actual linear velocity of the disc 130. A characteristic of a recordable optical disc, such as CD-R, is a pre-mastered continuous spiral groove useful to guide the optical pick-up along the track. The spiral groove contains a slight deviation, or wobble, which allows the drive to determine a rate of linear velocity by monitoring the rate of deviation, or frequency, of the wobble. The WBL signal 244 or a signal derived from the WBL signal 244 may additionally be fed back into the variable frequency clock circuit 204 to enable the variable frequency clock circuit 204 to monitor the speed of the linear velocity of the disc 130. Further details of an implementation of the spindle servo 206 are described in the accompanying description for FIG. 4.

The write power control 208 controls the power of a laser in the optical pick-up 122 by controlling the power level of the laser modulator 210. The laser modulator 210 turns the laser on and off as indicated by the EFM 238 at the power indicated by the write power control 208. The output power of the laser is very low when the drive 100 reads data from the disc. By contrast, the output power of the laser may be very high when the drive is writing to the disc 130. Other factors affecting the write power may include differences in types of media, such as CD-R versus CD-RW, differences in linear velocity, and erasing power versus writing or reading power. During a writing session to the disc 130, the write power control monitors the reflected light from a RF signal 246 the disc 130 to adjust the power level. Further details of an implementation of the write power control 208 are described in the accompanying description for FIG. 5.

The RF signal 246 is further used by the analog front end 212. One function of the analog front end 212 is to decode the WBL signal 244 from the RF signal 246. The variable band pass filter 214 further assists decoding of the WBL signal 244. For an optical disc conforming to a Compact Disc specification, the WBL signal 244 has a center frequency of 22.05 kHz at a linear velocity of 1×. The WBL signal 244 frequency is directly proportional to the linear velocity and thus at a linear velocity of 4×, the frequency of the WBL signal 244 is 88.2 kHz. The variable band pass filter 214 similarly varies the frequency range of the pass band to conform to the center frequency of the WBL signal 244. The center frequency of the variable band pass filter is determined by a SCFCK signal 248, which is proportional to the VFCLK signal 240 and to the linear velocity.

Figure 3:
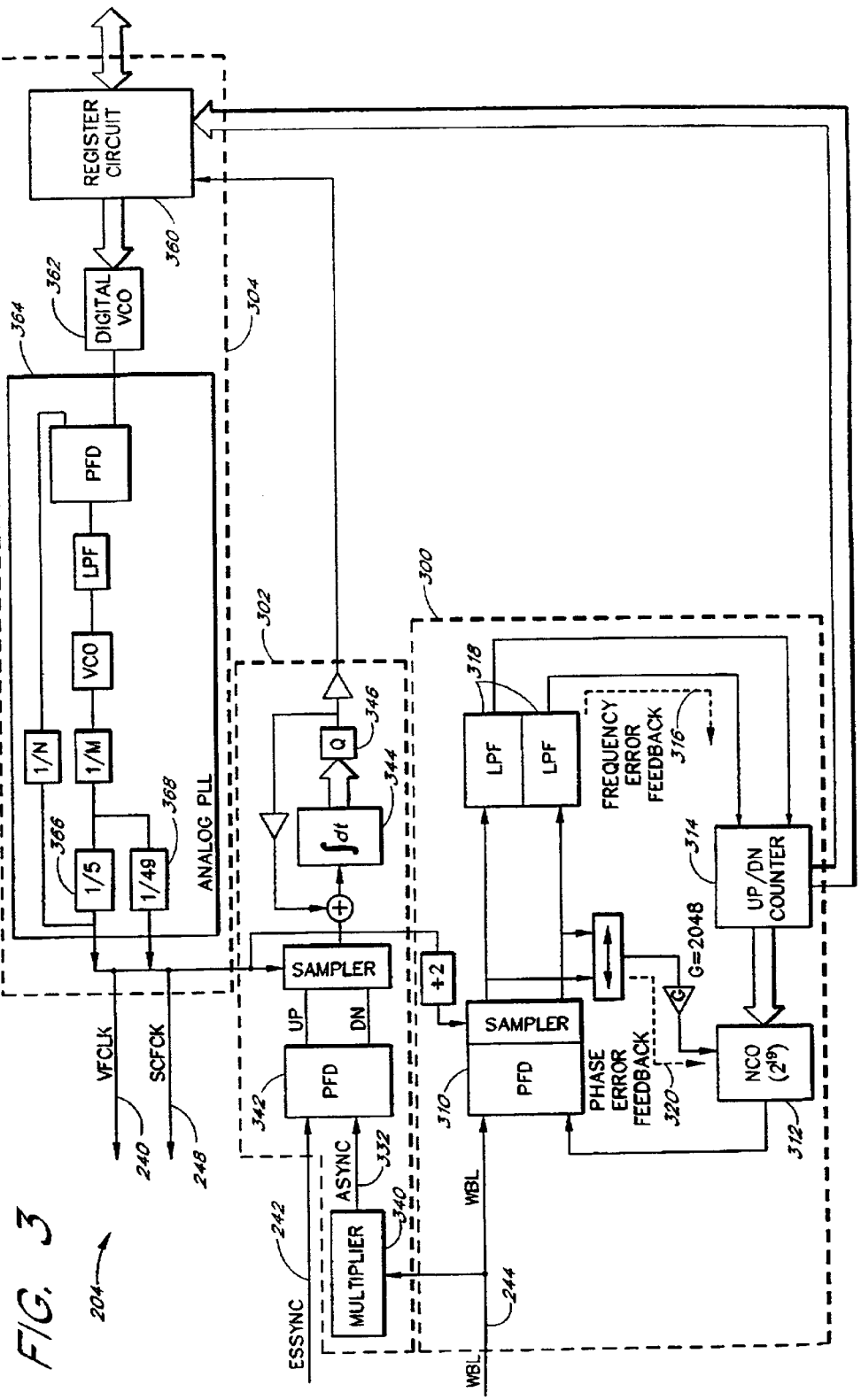
FIG. 3 illustrates an embodiment of a variable frequency clock circuit.

FIG. 3 illustrates a more detailed view of the variable frequency clock circuit 204. The major components of the variable frequency clock circuit as shown in FIG. 3 are a speed detection circuit 300, a phase detection circuit 302, and a clock generation circuit 304. The speed detection circuit 300 measures the frequency of the WBL signal 244 to determine the linear velocity of the disc.

The speed detection circuit 300 shown is implemented as a digital phase locked loop. A phase frequency detector (PFD) 310 compares the WBL signal 244 with an output of a Numerically Controlled Oscillator (NCO) 312. The output of the PFD is sampled at half the VFCLK rate, or, 192 times per WBL signal cycle (when the disc 130 is in sync). The NCO frequency is controlled by the output of an up/down counter 314. When the frequency of the NCO 312 is higher than the WBL signal 244 frequency, the PFD 310, through the first feedback path 316, causes the up/down counter 314 to count down, lowering the frequency of the NCO 312. The first feedback path 316 includes low pass filters 318 to prevent the first feedback path 316 from changing the frequency of the NCO too rapidly in response to short term frequency fluctuations as encountered with frequency shift keying (FSK) modulation. Similarly, when the frequency of the NCO 312 is lower than the WBL signal 244 frequency, the PFD 310 causes the up/down counter 314 to count up, raising the frequency of the NCO 314. The speed detection circuit 300 further includes a second feedback path 320 which can improve accuracy by controlling the phase of the NCO 312. When the frequency of the NCO 312 and the WBL signal 244 are matched, the output of the up/down counter 314 corresponds to the WBL signal 244 frequency. The output of the up/down counter 314 may be read by the microcontroller 112 to determine the linear velocity of the disc 130. One embodiment uses the output of the up/down counter 314 as a feedback input to maintain synchronization between the disc 130 and the VFCLK 240.

Some optical discs, such as CD-R and CD-RW, have Absolute Time in Pre-Groove (ATIP) information embedded within the WBL signal 244 by FSK modulation. One embodiment demodulates the ATIP information by using the phase error detected by the PFD 310.

Preferably, the quantization of the up/down counter 314 is such that the quantization error at a linear velocity of 0.5× is less than ±1 EFM frame. In another embodiment, the embodiment measures the frequency of the WBL signal 244 by timing the period of the WBL signal 244 and relating the period to the frequency with a look-up table.

The phase detection circuit 302 provides a phase error signal 330 to the clock generation circuit 304 to vary the VFCLK signal 240 such that synchronization is maintained between the ESSYNC signal 242 and an ASYNC signal 332. The EFM Encoder 202 generates the ESSYNC signal 242 to indicate the timing of the EFM signal 238. In one embodiment, where the ESSYNC signal 242 operates at the speed of the VFCLK signal 240, a multiplier 340, using a circuit such as a PLL, multiplies the WBL signal 244 by a factor of 392 to generate the ASYNC signal 332 such that when the actual linear velocity of the disc 130 matches the desired linear velocity speed as indicated by the VFCLK signal 240, the frequency of the ASYNC signal 332 matches the frequency of the ESSYNC signal 242. The phase detection circuit 302 includes a phase frequency detector 342 sampled at the VFCLK signal 240 rate and a non-linear delta sigma modulator for feedback. The feedback path and output path include an accumulator 344 for storing accumulated phase error and a three level quantizer 346 (−1, 0, +1) to ensure stability.

The clock generation circuit 304 accepts inputs from the microcontroller 112, the speed detection circuit 300, and the phase detection circuit. The clock generation circuit 304 gradually adjusts the VFCLK signal 240 towards the target frequency for a linear velocity selected by the microcontroller 112, while maintaining a tolerable phase relationship between the ASYNC signal 332 and the ESSYNC signal 242 and maintaining synchronization between the disc 130 and the EFM 238.

The clock generation circuit 304 includes a register circuit 360, a digital VCO 362, and an analog PLL 364. The register circuit 360 controls an output frequency of the digital VCO 362. The analog PLL 364 smoothes out jitter from the digital VCO 362 and generates the VFCLK signal 240 and the SCFCK signal 348. The register circuit 360 enables the microcontroller 112 to load a quantity which corresponds to a desired linear velocity and VFCLK 240 frequency. The register circuit 360 compares the quantity from the microcontroller 112 to the speed indicated by the speed detection circuit 300 to determine whether to increase or decrease an output of the register circuit 360, which then eventually increases or decreases the VFCLK signal 240 and the SCFCK signal 348. The register circuit 360 further monitors the phase error signal 330 from the phase detection circuit 302 to adjust the output of the register circuit 360 to maintain the tolerable phase relationship between the ASYNC signal 332 and the ESSYNC signal 242. Table 2, which follows, illustrates one scheme for adjusting the output of the register circuit.

TABLE 2

| |Phase Error| | Speed Comparison | Register Circuit Action |
|---|---|---|
| >threshold 1 | same | Compensate for phase error |
| >threshold 1 | different | Pause speed change, compensate for phase error |
| <threshold 1 | same | None |
| <threshold 1 | different | Allow speed change |

The digital VCO 362 accepts the output of the register circuit 360 and generates a digital clock signal with a frequency dependent upon the output of the register circuit 360. In one embodiment, the digital VCO 362 is a numerically controlled oscillator (NCO). In another embodiment, the digital VCO 362 is a delta-sigma modulator. A typical undesirable characteristic of a digital VCO is the presence of a large amount of jitter.

The analog PLL 364 may advantageously smooth out the jitter from the digital VCO 362. An output section of the analog PLL 364 includes a divide by 5 circuit 366 to generate the VFCLK signal 240 and a divide by 49 circuit 368 to generate the SCFCK signal 248. Exemplary frequencies at a 4× linear velocity include 34.5744 MHz for the VFCLK signal 240 and 3.528 MHz for the SCFCK signal 248.

Figure 4:
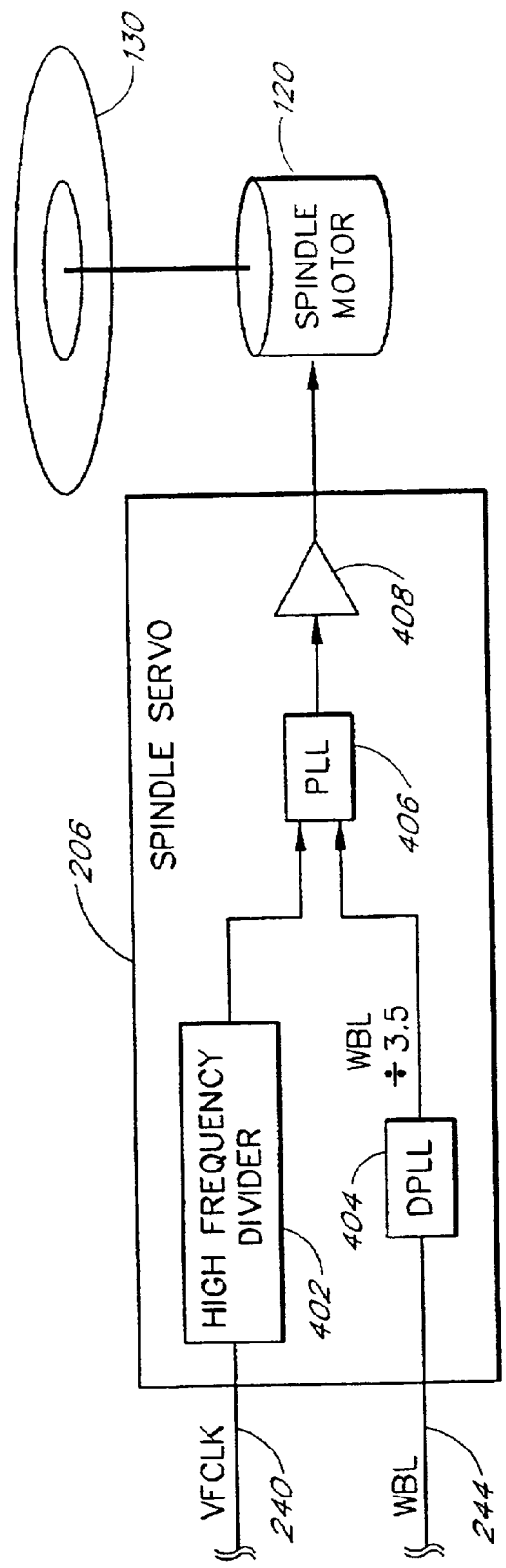
FIG. 4 illustrates an embodiment of a spindle servo.

FIG. 4 illustrates more detail for the spindle servo 206. The spindle servo comprises a high frequency divider 402, a DPLL circuit 404, a PLL 406, and an amplifier 408. The high frequency divider 402 divides the VFCLK signal 240 by 686. The VFCLK signal 240, indicates a desired linear velocity for the disc 130, which is rotated by the spindle motor 120, which in turn is controlled by the spindle servo 206. The DPLL 404 divides the WBL signal 244 by 3.5. The WBL signal 244 or a signal derived from the WBL signal 244 indicates the actual linear velocity for the disc 130. The DPLL 404 filters out transient deviations in the WBL signal 244 such as caused by FSK modulation. The outputs of the high frequency divider 402 and the DPLL 404 feed into the PLL 406, which compares the outputs. The PLL 406 generates an error signal to the amplifier 408 to conform the rate of rotation of the disc 130 to the linear velocity indicated by the VFCLK signal 240.

Figure 5:
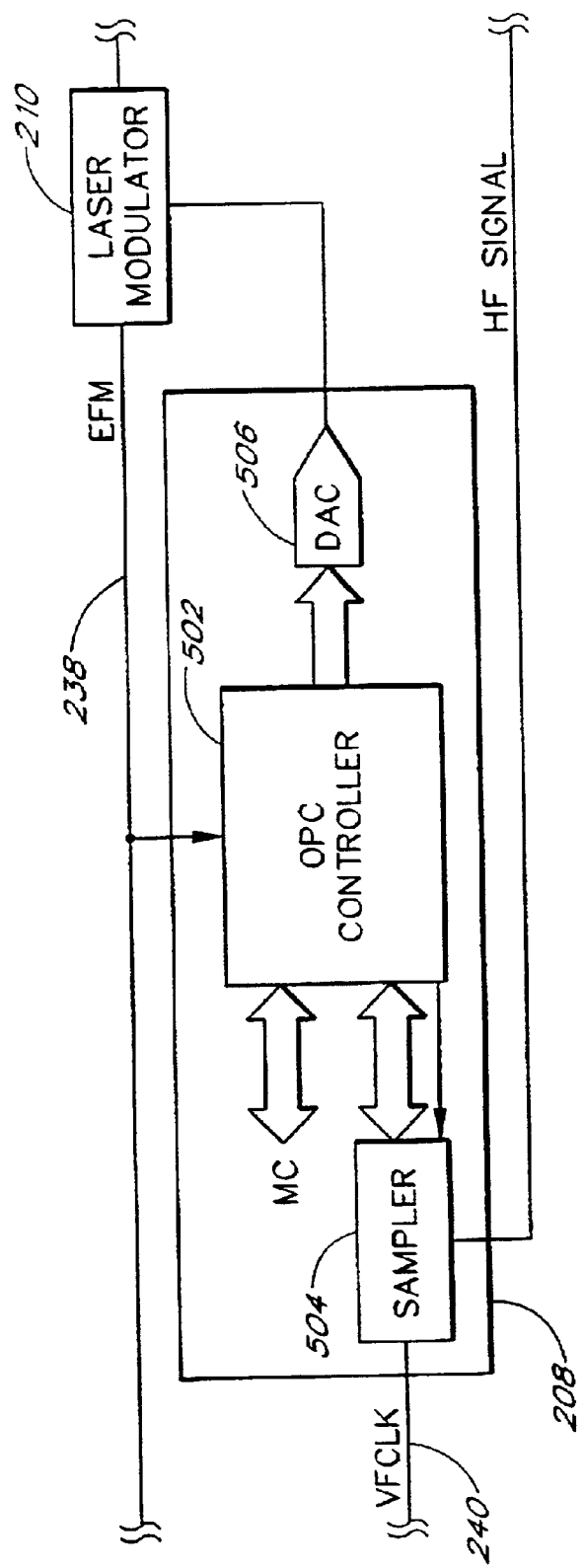
FIG. 5 illustrates an embodiment of a write power control circuit.

FIG. 5 illustrates further details of an implementation of the write power control 208. During a write process, the laser turns on and off and creates marks on the disc 130. The write power control 208 monitors results of the write process by the laser, and maintains the power of the laser on-the-fly so that the write power remains optimal for the writing conditions.

Figure 11:
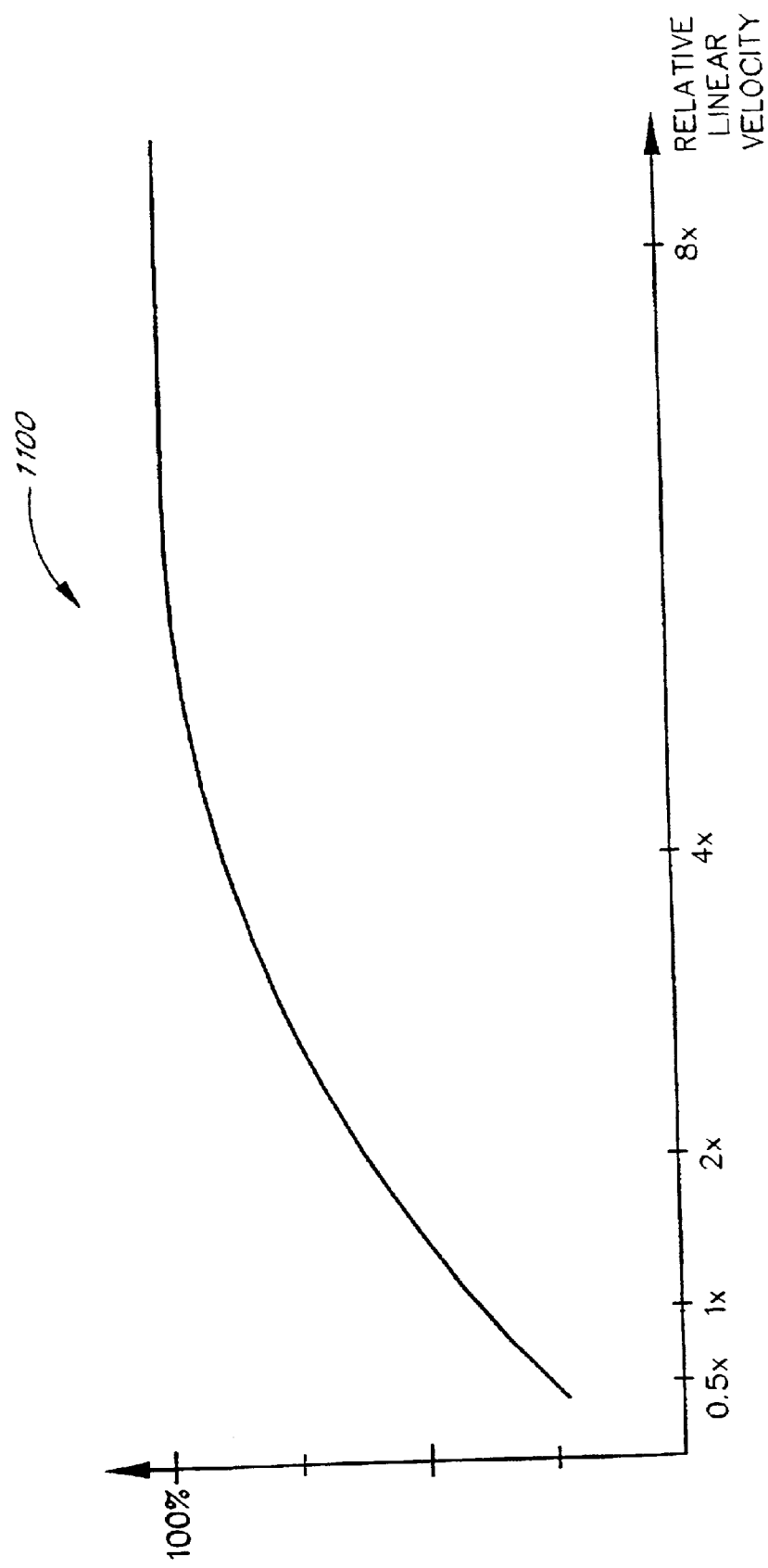
FIG. 11 illustrates a graph showing a variation in write power versus linear velocity.

FIG. 11 illustrates how the write power used by the laser may vary with the linear velocity of the disc 130. The shape of a relative power curve versus linear velocity, as illustrated by example in FIG. 11, varies dramatically with different media. For example, typical CD-R media is quite sensitive to write power and an appropriate relative power at a linear velocity corresponding to 8× may be four times greater than an appropriate relative power at 0.5x. By contrast, typical CD-RW media tends to be relatively insensitive to write power and a constant write power may produce adequate marks irrespective of a change in linear velocity within a reasonable linear velocity range.

Too much write power results in oversize marks that obliterate other marks. Too little write power results in undersize marks that may be difficult to read. A mark size may be measured by determining a duration of the mark as the mark passes over the optical pick-up 122. The write power control comprises an OPC controller 502, a sampler 504, and a DAC 506. The OPC controller 502 may receive an initial setting from the microcontroller 112 through the microcontroller bus 230. During the write process, the OPC controller 502 monitors and compares the EFM signal 238, which indicates the marks to be written on the disc 130 with a sampled reflected signal from the sampler 504. The sampler 504 samples the reflected signal at the VFCLK signal 240 rate. The sampled reflected signal indicates the size of the mark as it is being written. To adjust the writing power, the OPC controller increases and decreases a control input of the DAC 506, which adjusts the output power of the laser. In one embodiment, the write power control 208 further indicates to the microcontroller 112 the output power being used so that the microcontroller can determine whether the output power is within a reasonably expected range for the given conditions. In the art, adjusting the write power on the fly is known as "Running Optimum Power Control." One embodiment includes an on-the-fly adjustment range sufficient to accommodate a variability in write power with linear velocity.

Figure 6:
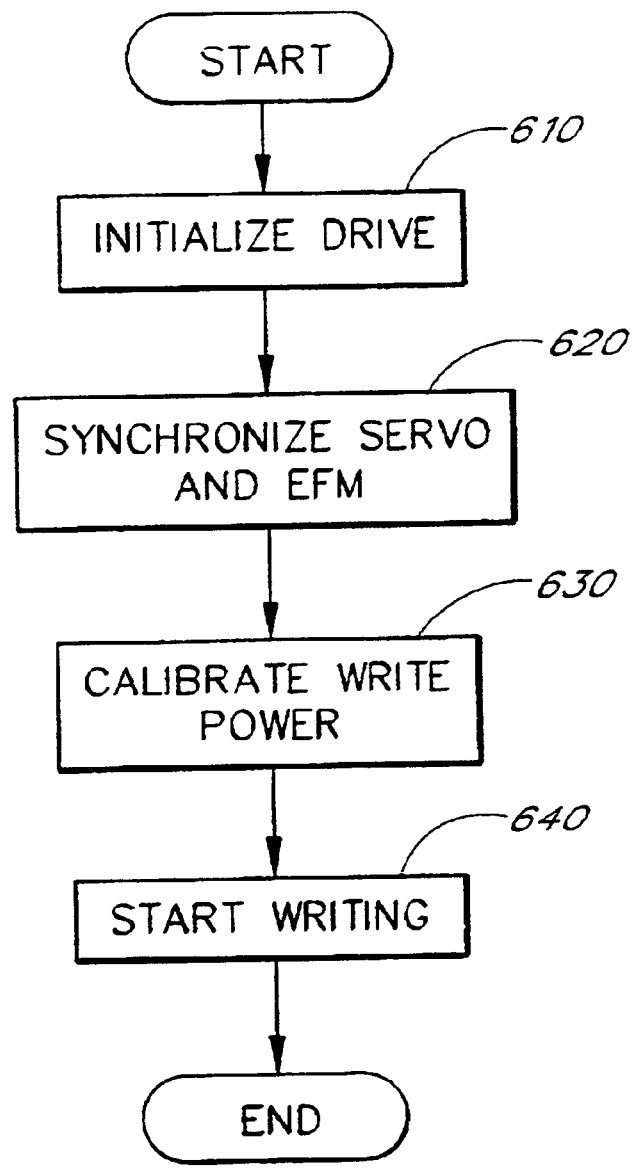
FIG. 6 is a flow diagram illustrating one embodiment of a method for preparing an optical drive to write to a disc.

FIG. 6 is a flowchart 600 illustrating an exemplary overview firmware 116 routine and method for initiating a writing session to an optical disc. The firmware 116 is stored in nonvolatile memory 114, such as flash EPROM. In one embodiment, the nonvolatile memory 114 is integrated into the microcontroller 112. In step 610, the firmware 116 initializes the components in the drive 116, such as interrupt controllers, latches, etc. and detects the type of recordable optical disc that is in the drive 116 to use the appropriate writing strategy for that type of disc.

In step 620, the firmware starts the spindle servo 206 and allows the spindle servo 206 to synchronize with the writing clock, VFCLK 240. In step 630, the firmware uses the optical pick-up 122 to write to the disc 130 at various power levels in order to determine an initial starting point for the write power. It will be understood by one of ordinary skill in the art that the writing itself occurs in a Power Calibration Area of the disc 130 not normally used to store data. In step 640, the firmware commands the drive to write to the disc 130. In one embodiment, the firmware waits until the buffer 118 has been filled to an appropriate level before commencing the write process.

Figure 7:
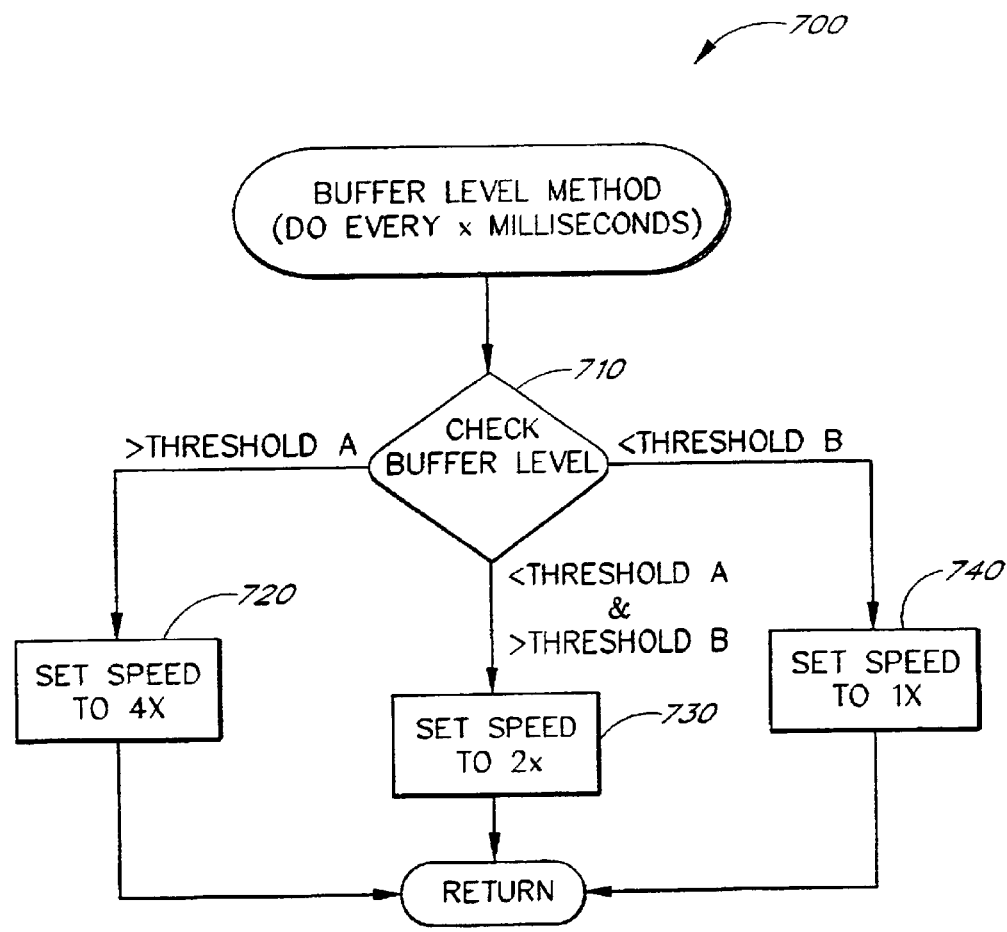
FIG. 7 is a flow diagram illustrating one embodiment of a method to select a writing speed.

FIG. 7 is a flowchart 700 illustrating one exemplary process that can be periodically executed by the firmware 116 to dynamically select a writing speed and linear velocity according to the buffer level. The routine may be executed in response to a timer interrupt, which may occur approximately every 10 milliseconds during the write process. It will be understood by one of ordinary skill in the art that when the buffer level has decreased because the host computer 102 has completed the transmission of data, then the firmware may treat the buffer level as if it were full.

In step 710, the firmware 116 checks the buffer level and then sets the rotation speed accordingly. In this example, when the buffer level is greater than threshold A (e.g., $\frac{2}{3}$ full), the target linear velocity is set to (or retained at) a "regular" operation speed of 4x (step 720). When the buffer level is less than threshold A but greater than threshold B (e.g., $\frac{1}{3}$ full), the target linear velocity is set to (or retained at) 2x to lower the read-out rate to 50% of the regular rate (step 730). When the buffer level is less than threshold B, the target linear velocity is set to (or retained at) 1x to lower the read-out rate to 25% of the regular rate (step 740). The method as disclosed in FIG. 7 can be modified to include a greater number of thresholds and rotation speeds, including non-standard speeds that fall between the 1x, 2x and 4x levels to provide newly-continuous speed adjustments. In one embodiment, the method selects between two speeds such as 4x and 2x, or 4x and 1x. It will be understood by one of ordinary skill in the art that initiating writing at a low speed, such as 1x and increasing the rate to 4x as conditions permit, is within the scope of the method disclosed in FIG. 7 and the methods that follow. In one embodiment, the method of selecting a linear velocity speed further includes hysteresis such that a threshold for slowing down differs than a threshold for speeding up. For example, in a two-speed method, a routine may change the linear velocity from 4x to 1x when the buffer level drops to 50% and may change the desired linear velocity from 1x to 4x when the buffer level has increased to 80%.

Figure 8:
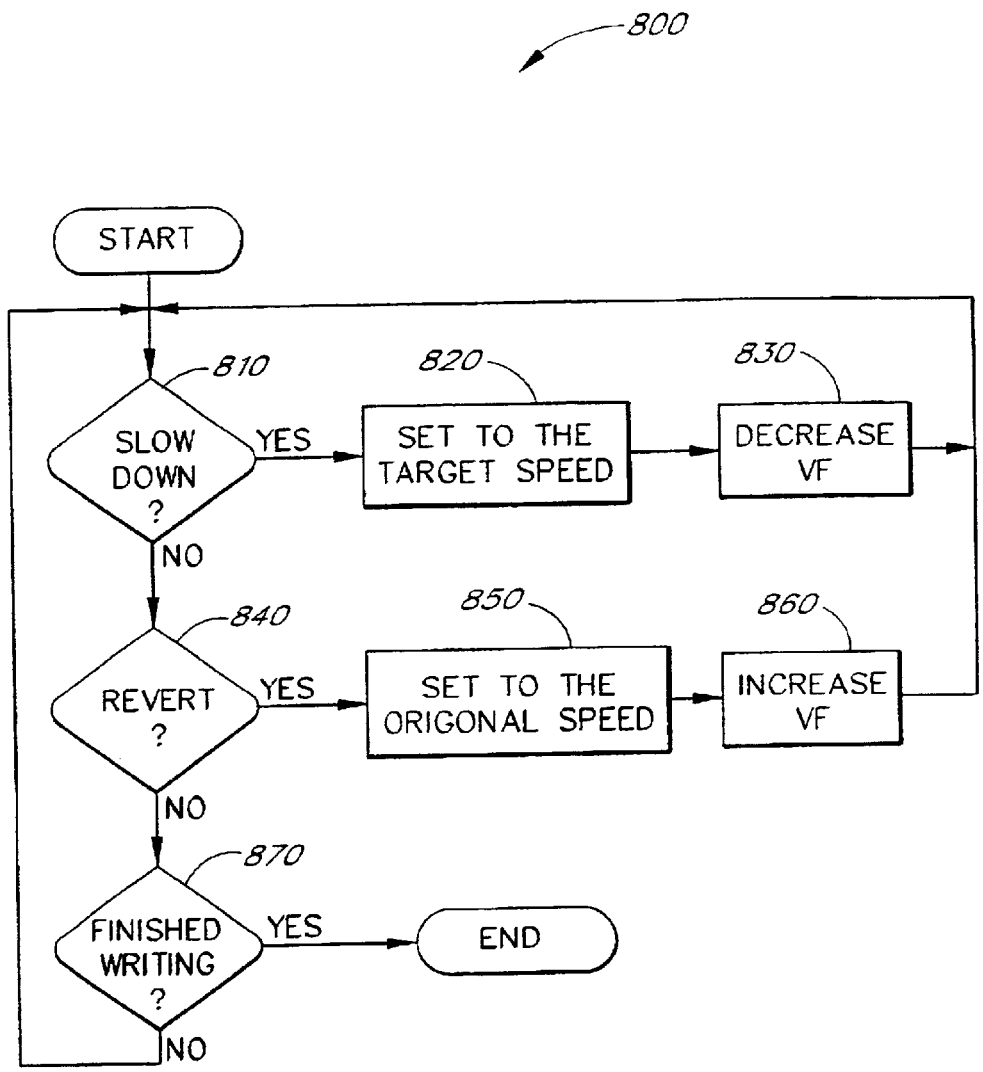
FIG. 8 is a flow diagram illustrating one embodiment of a method to gradually change a writing speed.

FIG. 8 illustrates an exemplary system level flowchart 800 for gradually changing the linear velocity in response to the targeted speed as selected by an algorithm such as that disclosed in FIG. 7. A gradual change in the linear velocity is preferred over an abrupt change. In one embodiment, the firmware 116 commands a change from 4x to 1x in small intermediate steps. In another embodiment, the firmware 116 commands an abrupt change and the variable frequency clock circuit 218 gradually implements the change.

A change that is too abrupt may result in a reduction in synchronization between the timing of the writing to the disc and the position of the writes. In severe cases, the phase locked loops may lose phase lock. The *Orange Book*, a standard Compact Disc reference, specifies a maximum phase difference between the ASYNC signal 332 and ESSYNC signal 242. The maximum phase difference specification is also known as an ATIP synchronization rule. The specification calls for a maximum phase error of approximately ±2 EFM frames per subcode frame, but since ±1 EFM frame per subcode frame is reserved for other sources of fluctuation, the drive preferably maintains a ±1 EFM frame per subcode frame synchronization while writing to a disc. Although a violation of the ATIP synchronization rule may result in a disc readable by some drives, drive manufacturers typically rely on specifications such as the ATIP synchronization rule. Thus, a disc 130 made by a drive conforming to the rule will be more robust.

Returning to FIG. 8, in steps 810 and 820, the firmware ascertains whether to set a different and slower speed (linear velocity) than currently set, and sets a target speed if there is a change. The flowchart 700 previously described in FIG. 7 discloses an algorithm for selecting a speed. In step 830, the system decreases the linear velocity by reducing the frequency of the VFCLK signal 240.

In steps 840 and 850, the firmware ascertains whether to return to a higher speed (such as 4x) if conditions permit and the higher speed is not currently commanded. In step 860, the system increases the liner velocity by increasing the frequency of the VFCLK signal 240. Step 870 indicates that the process is ongoing until the write process is complete.

The change in frequency of the VFCLK signal 240 preferably occurs in small increments. For example, a rate of change of ±1 EFM per subcode frame corresponds to approximately a 2% change in the pulse width. Other rates of change include using ±0.5 EFM per subcode frame. In one embodiment, the firmware 116 calculates the change in speed using a look-up table and sends the updates the frequency of the VFCLK signal 240 by updating the variable frequency clock circuit 204. In another embodiment, the firmware simply updates the variable frequency clock circuit 204 with the target linear velocity and allows the variable frequency clock circuit to gradually change the VFCLK signal 240 by gradually incrementing the input to the digital VCO 362. A multiplication/division by a quantity near 2% may easily be implemented by a simple shift and add/subtract circuit (or algorithm) as the rate of change is only a preferred maximum rate of change. For example, a shift of 6 bits to the right (multiplication by $2^{-5}$) and a subsequent add operation raises a number by about 1.56%. One embodiment includes a counter clocked by the VFCLK signal 240 to detect the passage of a subcode frame.

In one embodiment, the spindle servo 206 synchronizes the linear velocity of the portion of the disc 130 corresponding to the optical pick-up 122 to the VFCLK signal. At low rotational rates, typical spindle motors are capable of accelerating the linear velocity beyond a rate limited by the preferred rate of change of ±1 EFM per subcode frame. However, by gradually changing the VFCLK frequency, the spindle may maintain an acceleration of the disc 130 within the preferred ±1 EFM per subcode frame. In another embodiment, the drive limits an acceleration of the disc 130 by limiting a current supplied by the spindle servo 206 to the spindle motor 130 such that spindle servo 206 may not accelerate the disc 130 beyond the preferred ±1 EFM per subcode frame rule while the drive is writing to the disc. Yet another embodiment limits the acceleration of the disc 130 within the preferred ±1 EFM per subcode frame rule by including a sufficient amount of inertia rotated by the spindle motor 130.

In some embodiments of the drive 100, and particularly at higher disc speeds, the spindle motor 120 may not exhibit a sufficient amount of torque to accelerate the disc 130 at a rate matching a particular EFM per subcode frame rate. The drive 100 may detect the absence of the sufficient amount of torque by monitoring the phase error at the PLL 406 within the spindle servo 406. In one embodiment, the drive detects the absence of the sufficient amount of torque by monitoring the phase difference between the ESSYNC signal 242 and the ASYNC signal 332. When the phase error has reached a predefined threshold, the drive 100 may momentarily inhibit a change in the frequency of the VFCLK signal 240.

Figure 9A:
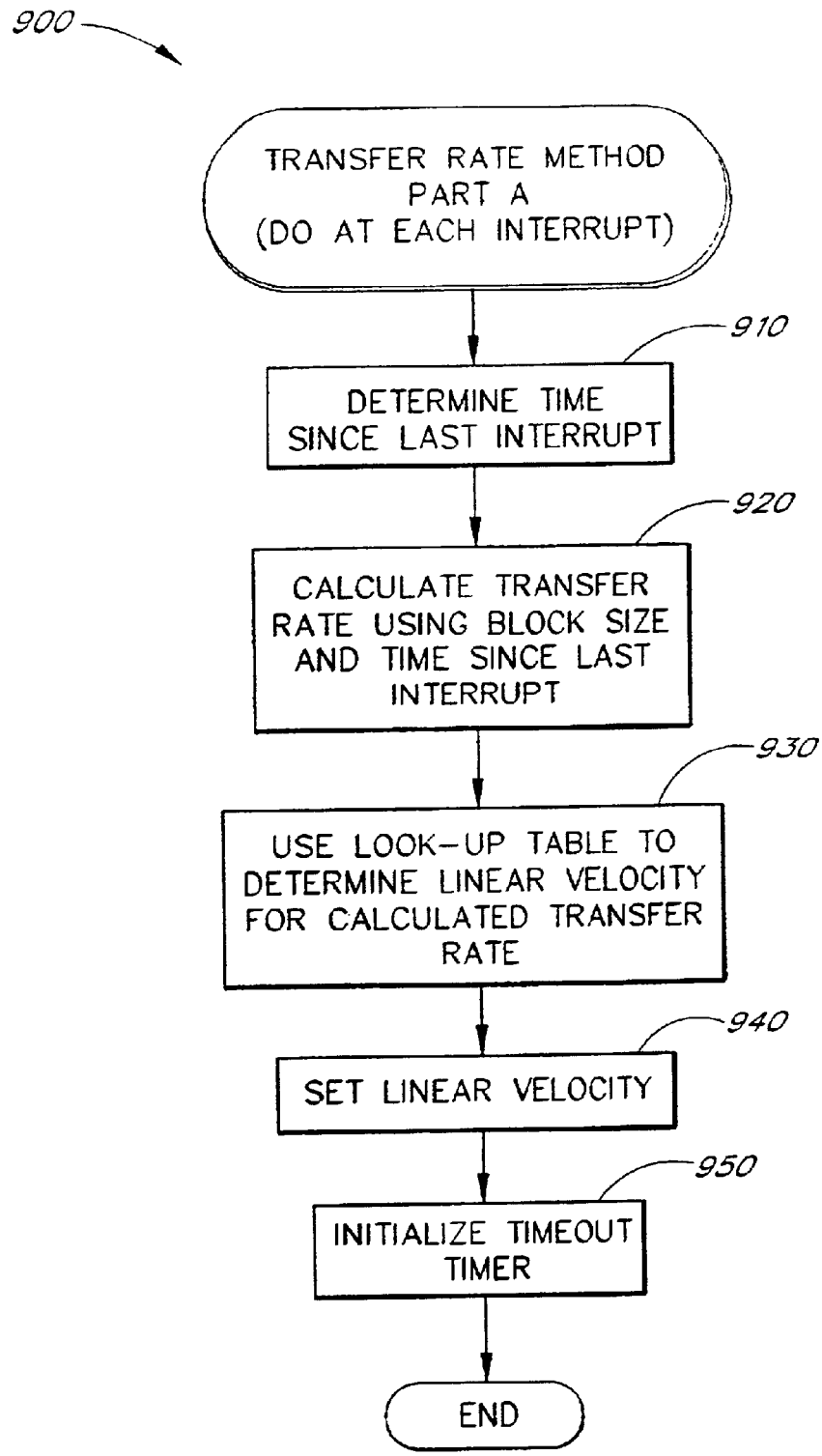
FIGS. 9A and 9B illustrate a method that may be used to vary the write speed in accordance with a data transfer rate from a communication link.
Figure 9B:
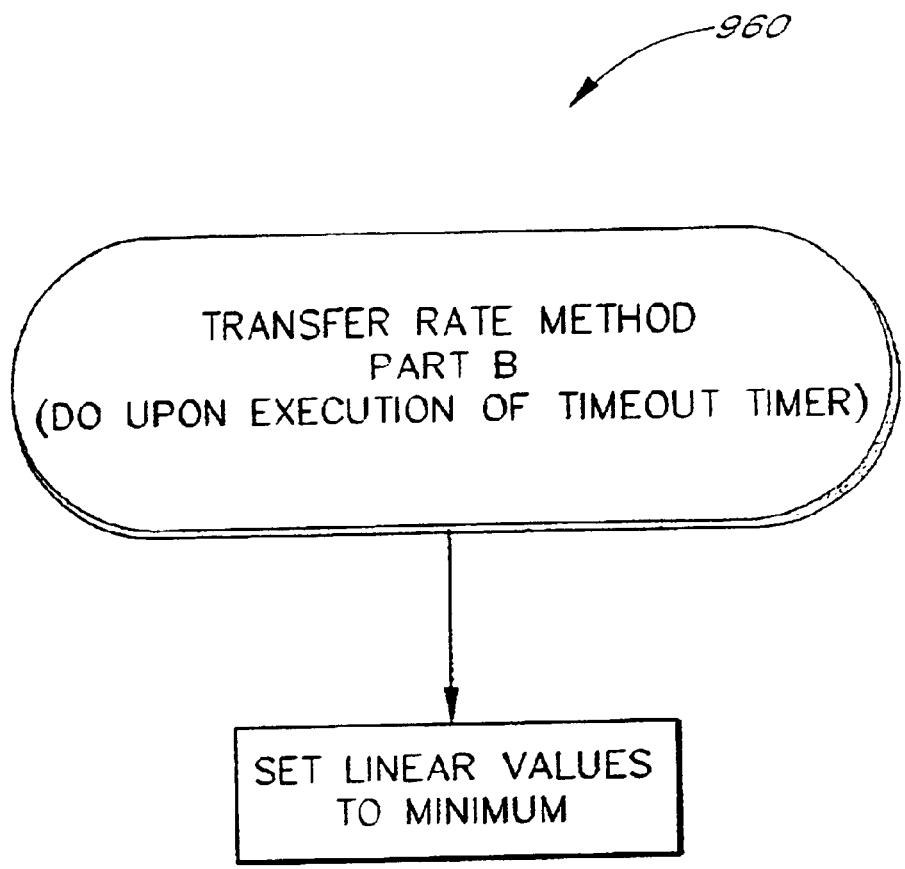

FIGS. 9A and 9B illustrate a method and a set of firmware routines that may be used to adjust the linear velocity according to the data transfer rate over the communication link 104. When the host 102 interrupts the controller 110 to initiate a new block transfer, a first routine 900 is executed to estimate the transfer rate and adjust the linear velocity accordingly. In steps 910 and 920, the routine measures the time since the last interrupt (i.e., the time since initiation of the last data transfer), and uses this information in combination with the corresponding block size (specified by the host at the time of the interrupt) to calculate the transfer rate. In steps 930 and 940, a look-up table (not shown) is used to set the linear velocity to a level which corresponds to the calculated transfer rate. In one embodiment, only the standard linear velocities of 1×, 2×, 4× etc. are used. In another embodiment, smaller incremental speed adjustments may be made to provide nearly-continuous speed adjustments. In step 950, a timeout timer is initiated with a value that corresponds to a timeout period. If this timer expires (i.e., reaches zero) before the next interrupt occurs, a second routine 960 shown in FIG. 9B is executed to set the linear velocity to a minimum setting. The minimum setting may vary considerably among particular embodiments as it may depend upon spindle jitter at low speeds, PLL performance at low speed, etc. One embodiment tests the disc by writing to the power calibration area to determine whether the media can support a 0.5× speed. Another embodiment varies the minimum linear velocity to sustain a minimum rpm limit (i.e., the minimum linear velocity rises as the optical pick-up moves radially outward). The embodiment may further allow a user to define the minimum linear velocity. For example, the host 102 may communicate a minimum requested linear velocity, such as 2×, over the communication link 104.

It will be understood by one of ordinary skill in the art that once the buffer 118 is full, the controller 110 may limit the data transfer rate from the host 102 to prevent the buffer from over-running. When the buffer is full or nearly full, the firmware 116 may treat the data rate as though it occurs at a maximum rate.

Figure 10A:
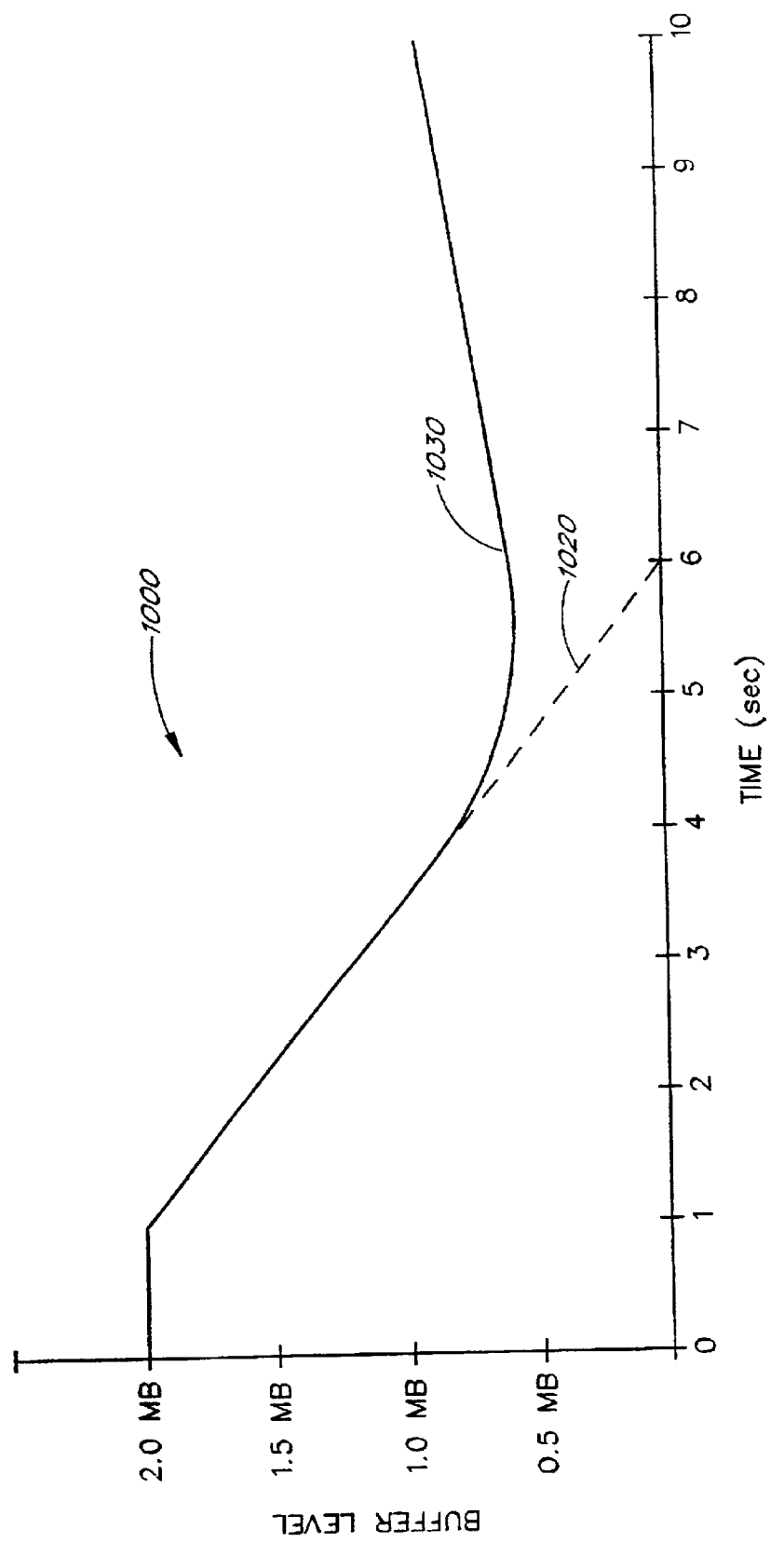
FIGS. 10A and 10B illustrate an exemplary sequence of events that occurs with an optical drive according to the prior art and a drive according to the invention when the data rate from the communication link falls below a writing speed.

As will be appreciated by the foregoing, the methods illustrated in FIGS. 7 and 10A/10B can be combined to provide a speed adjustment method that is based on both the buffer level and the transfer rate. This may be accomplished, for example, by taking the average of the speed settings produced by the two methods, or by using a look-up table that uses both the buffer level and the transfer rate to select the speed setting.

Figure 10B:
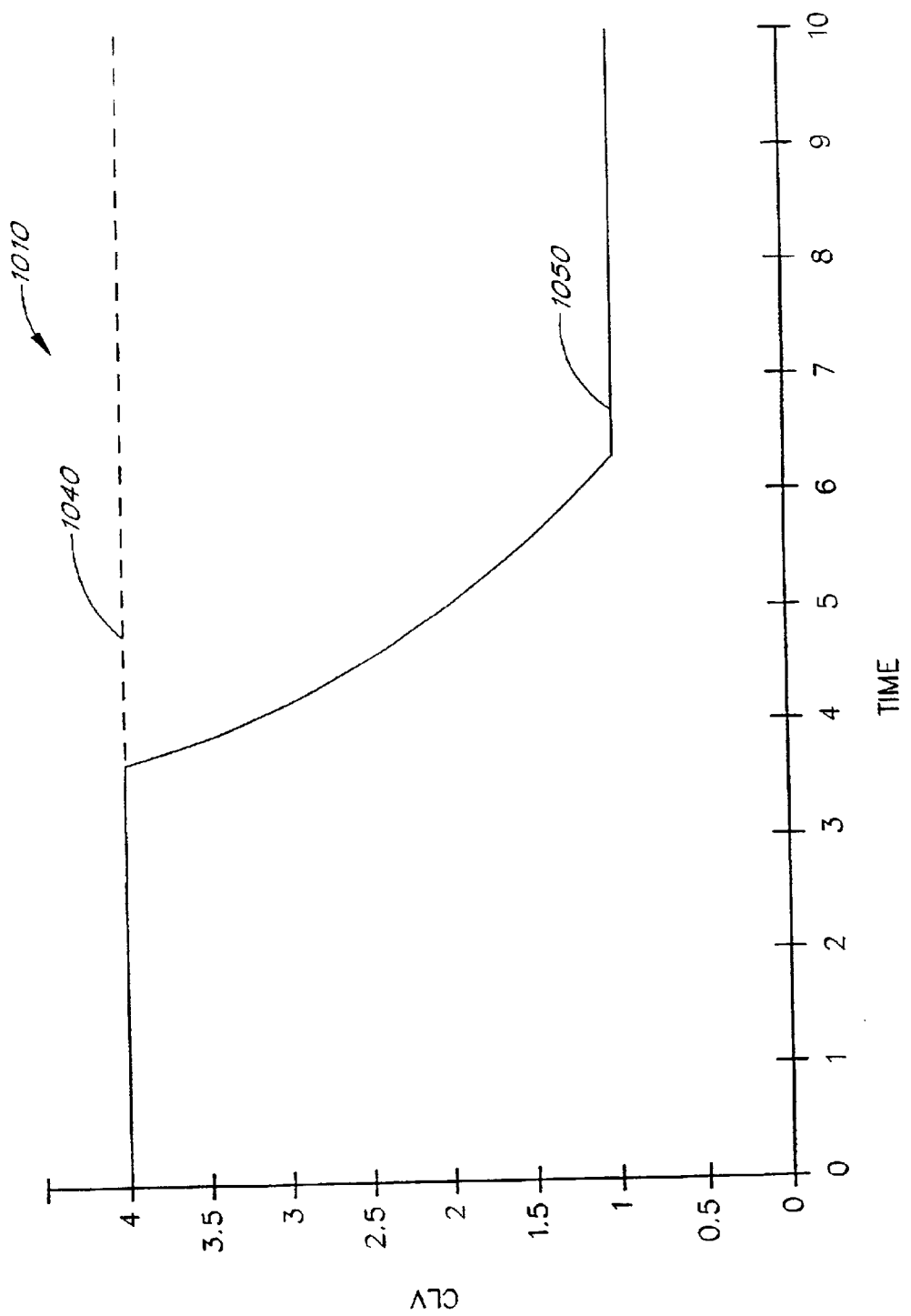

The graphs of FIGS. 10A and 10B illustrate an exemplary sequence of events that can occur when an optical drive is writing to an optical disc and the data rate of the communication link 104 fluctuates. FIG. 10A illustrates a first graph 1000 that shows time on a horizontal axis and a buffer level on the vertical axis. FIG. 10B illustrates a second graph 1010 that shows that shows time on a horizontal axis and a speed of the disc in terms of standard constant linear velocity (CLV) rates. For the example shown, the graphs compare outcomes from a typical dynamically fixed speed CD-RW drive and an embodiment of the present invention. Both drives use 2 MB buffers. At time zero, both drives have full buffers and are writing at a CLV of 4× with the communications link operating at 600 kB per second. At time t=1 second, the data rate on the communications link fluctuates and falls to 200 kB per second.

A dashed line 1020 corresponds to the buffer level of a conventional optical drive with a fixed writing speed of 4×. The dashed line 1020 illustrates that the conventional optical drive suffers a buffer under-run at t=6 seconds, or 5 seconds after the data rate on the communications link 104 has fallen to 200 kB per second. A solid line 1030 corresponds to the buffer level of an embodiment of the invention which dynamically changes writing speed in response to a low buffer level. In the example used in FIG. 10a, the embodiment sets a target speed of 1× upon detection of the buffer level falling below 1 MB. The minimum data transfer rate required to sustain a CLV of 1× is only 150 kB per second. The solid line 1030 illustrates that because the drive has slowed down to 1×, the embodiment does not suffer from a buffer under-run.

FIG. 10B illustrates the linear velocity of the conventional drive remaining at 4× as shown by the dashed line 1040. A solid line 1050 illustrates that after t=3.5 seconds (2.5 seconds after the fluctuation) the buffer level has fallen below 1 MB and the embodiment starts to slow down the write speed in a slow, gradual manner. The rate at which the embodiment shows is quite flexible within the preferred ±1 EFM per subcode frame rate rule and the limitations of the spindle motor 120. In the example shown, the embodiment has slowed to 1× speed at approximately t=6.3 seconds.

Figure 12:
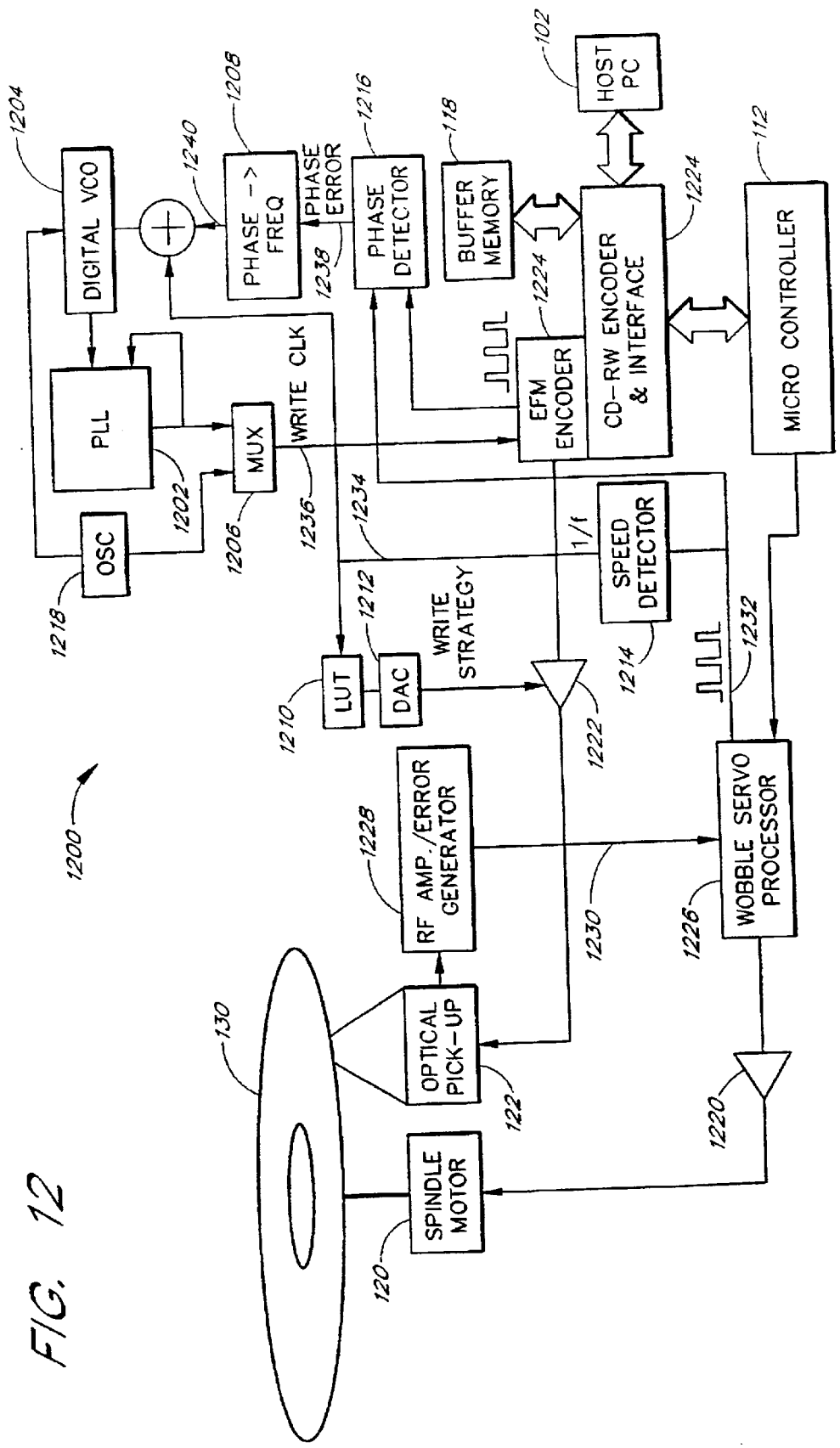
FIG. 12 illustrates an alternative embodiment of a controller for an optical drive system according to the invention.

FIG. 12 illustrates an alternative embodiment of a CD-RW drive control circuit 1200 that may be used to clock data from the buffer 118 and adjust the write power in response to changes in the rotation speed. The primary components that are provided for purposes of implementing the invention are a phase lock loop (PLL) device 1202, a digital voltage-controlled oscillator (VCO) 1204, a multiplexer (MUX) 1206, a phase-to-frequency converter 1208, a look-up table (LUT) 1210, a digital-to-analog converter (DAC) 1212, a speed detector 1214, and a phase detector 1216. The remaining components are components that are typically found within a CD-RW drive, including an oscillator 1218, amplifiers 1220 and 1222, an EFM encoder, a CD-RW encoder & interface 1224, a wobble servo processor 1226, and an RF amp/error generator 1228.

In operation, the microcontroller 112 sends commands to the wobble servo processor 1226 (according to the above-described methods) to adjust the rotation speed of the disc 130. During this process, the optical pick-up 122 provides a signal to the RF amp/error generator 1228 which in-turn provides a feedback signal 1230 to the wobble servo processor 1226. Based on this feedback signal 1230, the wobble servo processor 1226 adjusts the rotation speed and generates a pulse signal 1232 having a frequency that is proportional to the linear velocity of the disc 130. The speed detector 102 converts this pulse signal 1232 into a speed signal 1234, which may optionally be in a digital form (e.g., periodically generated binary values that represent the current speed).

The speed signal 1234 is used to periodically adjust the write power used by the optical pick-up 122 to write data to the disc 130. As depicted in FIG. 12, this may be accomplished by looking up the appropriate write power from the look-up table 1210, and then converting this setting to analog form using the digital-to-analog converter 1212. The analog "write strategy" signal is used to control the gain of the write amplifier 1222.

An output of the multiplexer 1206 is a write clock signal 1236 that is used to clock data from the buffer 118. When the drive is operating in a fixed speed mode, the multiplexer 1206 selects the oscillator 1218 as the source of the write clock signal. When the rotation speed is being adjusted, the multiplexer 1206 selects the output of the PLL device 1202.

During speed adjustments, it is important that the write clock signal 1236 be closely synchronized with the rotational state of the disc 130. Unless such synchronization exists, data may be read from the buffer 118 and written to the disc 130 at an erroneous rate or with erroneous timing. To achieve such synchronization, the EFM encoder 1224 passes the write clock signal 140 (or a signal derived from the write clock signal) to the phase detector 1216. The phase detector 1216 compares the phase of the write clock signal 1236 to the phase of the pulse signal 1232 generated by the wobble servo processor 1226, and generates a corresponding phase error signal 1238. The phase-to-frequency converter 1208 converts this phase error signal 1238 into frequency error signal 1240. The frequency error signal 1240 is summed with the speed signal 1234 to generate a control input to the digital VCO 1204. The digital VCO 1204 operates in combination with the PLL device 1202 to adjust the write clock signal 1236 so as to reduce or eliminate the phase error.

Figure 13:
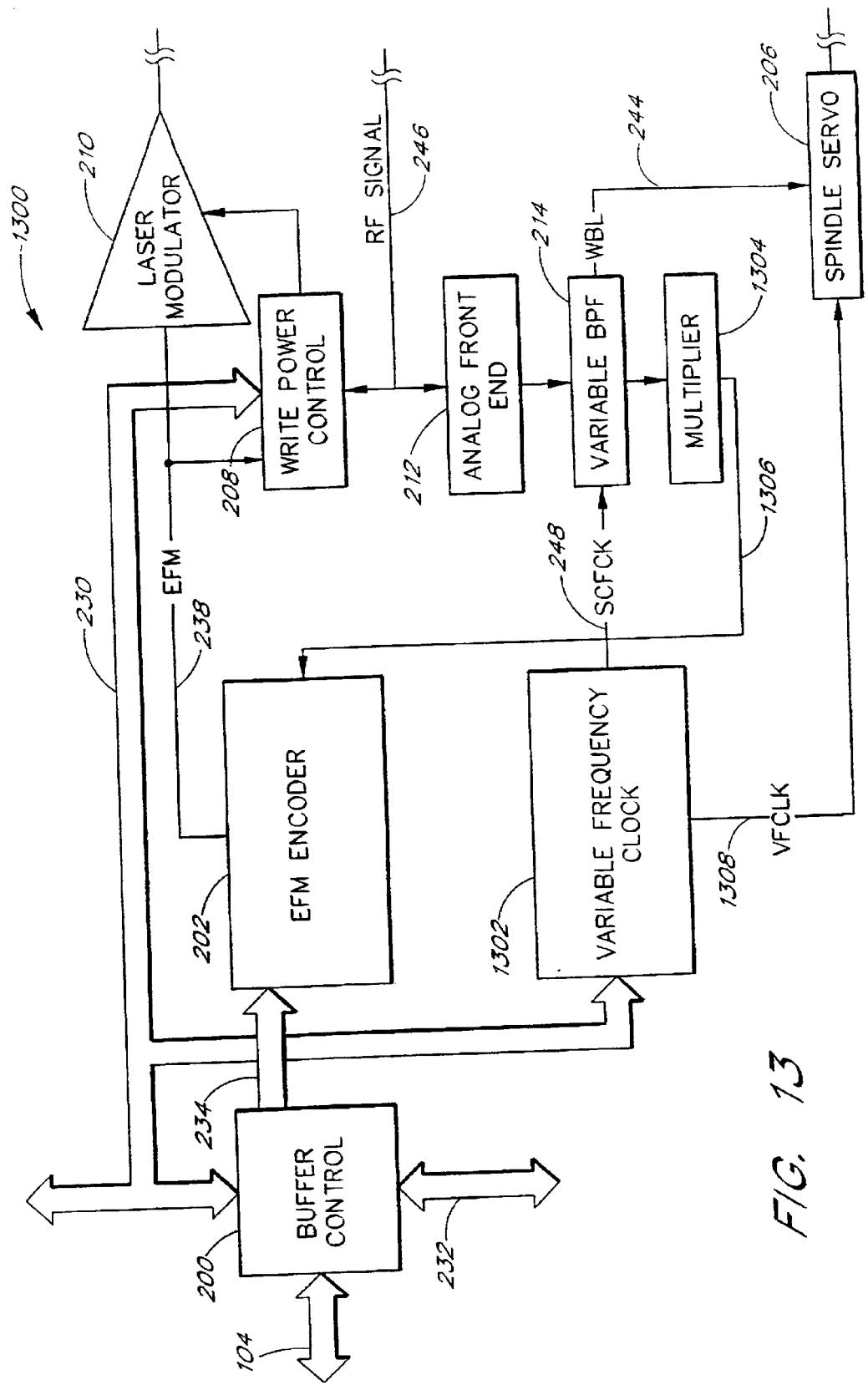
FIG. 13 illustrates another alternative embodiment of a controller for an optical drive system according to the invention.

FIG. 13 illustrates an alternative embodiment of a controller 1300, similar to the controller 110 shown in FIG. 2, that may be used to dynamically vary the write speed and the linear velocity of the disc 130. The controller 1300 shown in FIG. 13 includes the buffer control 200, the EFM encoder 202, a variable frequency clock circuit 1302, the spindle servo 206, the write power control 208, the laser modulator 210, the analog front end 212, and the variable BPF 214. The controller 1300 shown varies the linear velocity of the disc 130 by varying an output frequency, VFCLK signal 1308, of the variable frequency clock circuit 1302. The spindle servo 206 synchronizes the linear speed of the disc 130 to the VFCLK signal 1308 as described in the description for FIG. 4. The controller further includes a multiplier 1304, which generates a first signal 1306 multiplied from the WBL signal 244 or a signal derived from the WBL signal 244. The EFM encoder 202 synchronizes write pulses to the disc 130 to the first signal 1306. Preferably, when synchronized, the VFCLK signal 1302 and the first signal 1306 are at the same frequency.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. An optical drive system, the optical drive system adapted to write data at a substantially linear density on an optical disc, the optical drive system further adapted to change a linear velocity while writing to the optical disc to reduce a likelihood of a buffer under-run condition, the optical drive system comprising:

a spindle, the spindle adapted to rotate the optical disc, the spindle including a servo, where the servo controls a rotational speed of the spindle;

an optical pick-up adapted to write data to the optical disc, where the optical pick-up is also adapted to detect a signal relating to a linear velocity of the optical disc at a position on the optical disc adjacent to the optical pick-up; and a controller, the controller communicating to a host computer to receive data to be written to the disc, the controller communicating with the optical pick-up to transmit the data to the disc, the controller further adapted to control the rotational speed of the spindle such that the linear velocity of the position on the optical disc adjacent to the optical pick-up may be dynamically changed while the optical pick-up is writing the data to the disc.

2. The optical drive as defined in claim 1, further comprising a memory buffer communicating with the controller to store data to be written to the disc.

3. The optical drive as defined in claim 2, wherein in response to a decreased amount of data stored within the memory buffer, the controller decreases the rotational speed of the spindle such that the linear velocity of the position on the optical disc adjacent to the optical pick-up decreases.

4. The optical drive as defined in claim 2, wherein in response to an increased amount of data stored within the memory buffer, the controller increases the rotational speed of the spindle such that the linear velocity of the position on the optical disc adjacent to the optical pick-up increases.

5. The optical drive as defined in claim 1, wherein in response to a decrease in a transmission rate between the host computer and the controller, the controller decreases the rotational speed of the spindle such that the linear velocity of the position on the optical disc adjacent to the optical pick-up decreases.

6. The optical drive as defined in claim 1, wherein in response to an increase in a transmission rate between the host computer and the controller, the controller increases the rotational speed of the spindle such that the linear velocity of the position on the optical disc adjacent to the optical pick-up increases.

7. The optical drive as defined in claim 1, wherein the controller limits a rate of change of the rotational speed of the spindle such that where the optical disc corresponds to a recordable Compact Disc format, a maximum rate of change is one EFM frame per subcode frame.

8. The optical drive as defined in claim 1, wherein the controller limits a rate of change of the rotational speed of the spindle such that where the optical disc corresponds to a recordable Compact Disc format, a maximum rate of change is one-half an EFM frame per subcode frame.

9. The optical drive as defined in claim 1, wherein the controller further limits a requested rate of change of the rotational speed of the spindle to a rate within a torque limit of the spindle.

10. The optical drive as defined in claim 1, further including a variable frequency clock, wherein an output frequency of the variable frequency clock controls a rate by which data is written to the disc and the rotation rate of the disc such that the linear velocity of the position on the optical disc adjacent to the optical pick-up is proportional to the rate by which data is written to the disc.

11. The optical drive as defined in claim 1, further including limiting a servo drive current to prevent a rate of change in spindle speed of greater than one EFM frame per subcode frame during a write to the optical disc.

12. The optical drive as defined in claim 1, wherein an inertia rotated by the spindle is sufficient to prevent a rate of change in spindle speed of greater than one EFM frame per subcode frame during a write to the optical disc.

13. The optical drive as defined in claim 1, where the optical disc corresponds to a recordable Compact Disc format, wherein the controller controls the linear velocity such that a minimum linear velocity corresponds to a 1× speed.

14. The optical drive as defined in claim 1, where the optical disc corresponds to a recordable Compact Disc format, the controller controls the linear velocity such that a minimum linear velocity corresponds to a 0.5× speed.

15. The optical drive as defined in claim 14, wherein the controller maintains the minimum linear velocity limit such that an angular velocity of the spindle does not fall below a preset limit.

16. The optical drive as defined in claim 1, wherein the controller is configurable to enable the host computer to select a minimum linear velocity.

17. The optical drive as defined in claim 1, further including a write power control circuit adapted to dynamically vary a write power of a laser used to write data on the optical disc while writing to the optical disc such that the write power is substantially optimized for the writing conditions.

18. A method of writing data to an optical disc comprising:
    receiving data to be written to the optical disc from a host computer;
    storing data to be written to the optical disc in a memory buffer;
    writing data from the memory buffer to the optical disc in a continuous write sequence at a substantially constant linear density;
    detecting a condition that may result in a buffer under-run event; and
    changing a linear velocity of the optical disc in response to the condition while writing to the optical disc to reduce a likelihood of the buffer under-run event occurring.

19. The method as defined in claim 18, wherein the condition detected is a decreased buffer level, where the buffer level corresponds to an amount of data within the memory buffer that is to be written to the disc, and the linear velocity decreases in response to the decreased buffer level condition.

20. The method as defined in claim 18, further including increasing the linear velocity in response to detecting an increased buffer level condition, where the buffer level corresponds to an amount of data within the memory buffer that is to be written to the disc.

21. The method as defined in claim 18, wherein the condition detected is a decrease in a rate of received data, and the linear velocity decreases in response to the detected condition.

22. The method as defined in claim 18, further including increasing the linear velocity in response to detecting an increase in a rate of received data.

23. The method as defined in claim 18, further including restoring an original linear velocity when a buffer level exceeds a preset threshold, where the buffer level corresponds to an amount of data within the memory buffer that is to be written to the disc.

24. The method as defined in claim 18, further including changing a frequency of a clock signal, wherein the linear velocity and a rate at which data is written to the disc are controlled by the clock signal such that changing the frequency of the clock signal changes the linear velocity and the rate at which data is written to the disc.

25. The method as defined in claim 18, further including detecting a characteristic of reflected light from a writing laser pulse and adjusting a write power during a writing process to substantially optimize the writing power.

26. A write power control circuit adapted to dynamically vary a write power of a laser used to write data on an optical disc while writing to the optical disc and changing a linear velocity of the optical disc, the write power control circuit comprising:
    an amplifier, a control input of the amplifier controlling an output of the amplifier, the output of the amplifier affecting the write power of the laser;
    a sampling circuit, the sampling circuit measuring a characteristic of a mark made by the laser on the optical disc at a discrete time; and
    a feedback circuit, the feedback circuit receiving the characteristic of the mark from the sampling circuit, the feedback circuit comparing the characteristic of the mark to a target characteristic, the feedback circuit adapted to maintain the write power of the laser by manipulating the control input of the amplifier to align a characteristic of marks made by the laser to the target characteristic, the feedback circuit further configured to provide a sufficient power adjustment range to accommodate a change in the linear velocity of the optical disc.

27. The write power control circuit as defined in claim 26, wherein the amplifier includes a digital to analog converter.

28. The write power control circuit as defined in claim 26, further comprising a speed detecting circuit for detecting the linear velocity of the disc and a look-up table for maintaining a write power at a linear velocity detected by the speed detecting circuit.

29. The write power control circuit as defined in claim 26, wherein the characteristic of the mark is a size of the mark.

30. The write power control circuit as defined in claim 26, further including an out-of-range detection circuit, the out-of-range detection circuit indicating an error when the write power has deviated beyond a range, the range varying with the linear velocity of the disc.

31. A method of controlling a write power of a laser of an optical drive while the laser is writing to an optical disc, the optical drive capable of varying a linear velocity of the optical disc while the laser is writing to the optical disc, the method comprising:
  changing a linear velocity of the optical disc while the laser is writing to the optical disc;
  detecting a characteristic of a mark made by the laser on the optical disc;
  comparing the detected characteristic of the mark to a target characteristic and adjusting the write power of the laser.

32. The method as defined in claim 31, wherein adjusting the write power of the laser conforms characteristics of marks made by the laser to the target characteristic.

33. The method as defined in claim 31, further including detecting a signal proportional to the linear velocity, where the signal is used to select a range of power for the laser.

34. A controller for an optical drive, the optical drive adapted to write data on an optical disc and change a linear velocity while writing to the optical drive to reduce a likelihood of a buffer under-run condition, the controller comprising:
  a first circuit adapted to monitor a write speed;
  a second circuit adapted to monitor a linear velocity of the optical disc; and
  a third circuit adapted to change the linear velocity of the optical disc and maintain the write speed and the linear velocity such that the write speed and the linear velocity maintain a relationship while the linear velocity changes.

35. The claim as defined in claim 34, wherein the first circuit is further adapted to receive a first signal, the first signal indicating when data is written to the optical disc, the first signal proportional to a write speed.

36. The claim as defined in claim 34, wherein the second circuit is further adapted to receive a second signal, the second signal indicating a position of the optical disc, the second signal proportional to the linear velocity of a portion of the optical disc where the optical drive is writing to the optical disc.

37. The claim as defined in claim 34, wherein the third circuit is further adapted to generate a third signal, where a frequency of the third signal controls both the write speed of data to the optical disc and the linear velocity of the optical disc, where the frequency of the third signal varies with a control input, where the third circuit maintains the third signal such that a first signal indicating the write speed and a second signal indicating a linear velocity of the disc maintain a phase relationship within a predetermined limit and maintain a constant frequency relationship.

38. The controller as defined in claim 37, wherein the predetermined limit corresponds to ±1 EFM frame per subcode frame.

39. An optical drive system, the optical drive system adapted to write data on an optical disc and change a linear velocity while writing to the optical drive, the optical drive system comprising:
  a control circuit adapted to receive data to be written to the optical disc from a host computer;
  a buffer adapted to store data received by the control circuit;
  a writing circuit adapted to retrieve data from the buffer, the writing circuit further adapted to write the data from the buffer as a series of pulses recorded on the optical disc in a continuous write sequence at a substantially constant linear density;
  a detection sensor adapted to detect a condition that may result in a buffer under-run event; and
  a writing speed circuit, the writing speed circuit adapted to control a rate at which the writing circuit records to the optical disc, the writing circuit further adapted to decrease a linear velocity of the optical disc in response to the detected condition while writing to the optical disc to reduce a likelihood of an occurrence of the buffer under-run event.

40. The optical drive system as defined in claim 39, wherein the detection sensor includes a circuit adapted to monitor a level in the buffer, the level corresponding to an amount of the buffer holding data to be written to the disc.

41. The optical drive system as defined in claim 39, wherein the detection sensor is a software algorithm which monitors a parameter related to a flow of data to the buffer and a parameter related to a flow of data out of the buffer.

* * * * *